United States Patent
Cho et al.

(10) Patent No.: US 12,327,367 B2
(45) Date of Patent: Jun. 10, 2025

(54) ELECTRONIC DEVICE FOR GENERATING DEPTH INFORMATION OF REGION OF INTEREST AND OPERATION METHOD THEREOF

(71) Applicant: SAMSUNG ELECTRONICS CO., LTD., Suwon-si (KR)

(72) Inventors: Soonyong Cho, Yongin-si (KR); Yongkoo Park, Hwaseong-si (KR); Yoojeong Seo, Hwaseong-si (KR); Seokhyeon Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 421 days.

(21) Appl. No.: 17/744,893

(22) Filed: May 16, 2022

(65) Prior Publication Data
US 2022/0366588 A1     Nov. 17, 2022

(30) Foreign Application Priority Data
May 17, 2021   (KR) .................. 10-2021-0063620

(51) Int. Cl.
*G06T 7/593*     (2017.01)
*G06V 10/25*    (2022.01)

(52) U.S. Cl.
CPC ............. *G06T 7/593* (2017.01); *G06V 10/25* (2022.01); *G06T 2207/10028* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 9,445,018 B2 | 9/2016 | Fettig et al. | |
| 10,148,864 B2 | 12/2018 | Wang et al. | |
| 10,362,296 B2 | 7/2019 | Price et al. | |
| 11,051,039 B2 * | 6/2021 | Alpaslan | H04N 13/232 |

(Continued)

FOREIGN PATENT DOCUMENTS

| | | | | |
|---|---|---|---|---|
| CN | 106535806 B | * | 6/2019 | ............... A61B 1/00 |
| CN | 112235508 A | * | 1/2021 | ......... H04N 5/23212 |

(Continued)

OTHER PUBLICATIONS

"CES 2020: Samsung's invisible keyboard for smartphones", BBC News, Jan. 9, 2020, 1 page total, https://www.bbc.com/news/av/technology-51057261/ces-2020-samsung-s-invisible-keyboardfor-smartphones.

*Primary Examiner* — Jiangeng Sun
(74) *Attorney, Agent, or Firm* — MORGAN, LEWIS & BOCKIUS LLP

(57) ABSTRACT

Provided is an electronic device including a camera module configured to sense an object based on a plurality of photoelectric conversion elements and generate stereo image data having a disparity based on at least two of the plurality of photoelectric conversion elements sharing a micro lens, a memory configured to store at least one instruction and the stereo image data, and a processing circuit configured to execute the at least one instruction to detect an object of interest based on the stereo image data, and generate a crop signal for instructing the camera module to sense a region of interest including the object of interest; and generate depth information based on the stereo image data.

19 Claims, 27 Drawing Sheets

(56) References Cited

U.S. PATENT DOCUMENTS

| | | | | |
|---|---|---|---|---|
| 2006/0011804 A1* | 1/2006 | Engelmann | ............ | G02B 21/008 |
| | | | | 250/201.3 |
| 2006/0011858 A1* | 1/2006 | Engelmann | ........ | G02B 21/0076 |
| | | | | 250/458.1 |
| 2012/0056990 A1* | 3/2012 | Yoshie | ................. | H04N 13/189 |
| | | | | 348/46 |
| 2013/0064453 A1* | 3/2013 | Nagasaka | ............... | H04N 23/95 |
| | | | | 382/190 |
| 2018/0352254 A1* | 12/2018 | Alpaslan | .............. | H04N 13/232 |
| 2020/0160559 A1 | 5/2020 | Urtasun et al. | | |
| 2021/0160477 A1* | 5/2021 | Oh | ........................ | H04N 13/254 |
| 2022/0311985 A1* | 9/2022 | Cheng | ................. | H04N 13/128 |

FOREIGN PATENT DOCUMENTS

| | | | |
|---|---|---|---|
| JP | 2006-172381 A | | 6/2006 |
| KR | 10-1119941 B1 | | 3/2012 |
| KR | 10-1207862 B1 | | 12/2012 |
| KR | 20190042472 A | * | 10/2018 |
| KR | 10-2020-0056709 A | | 5/2020 |

* cited by examiner

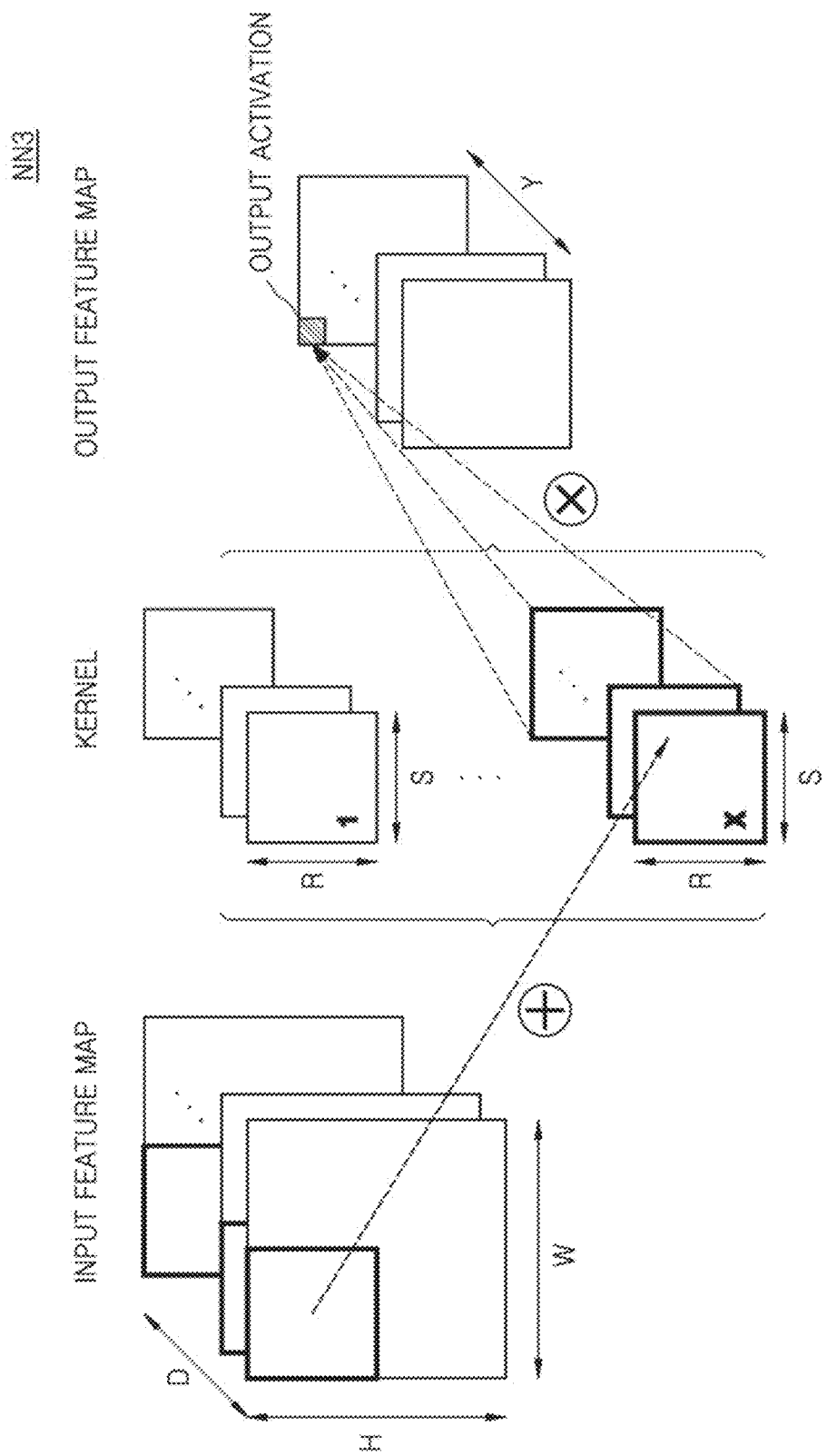

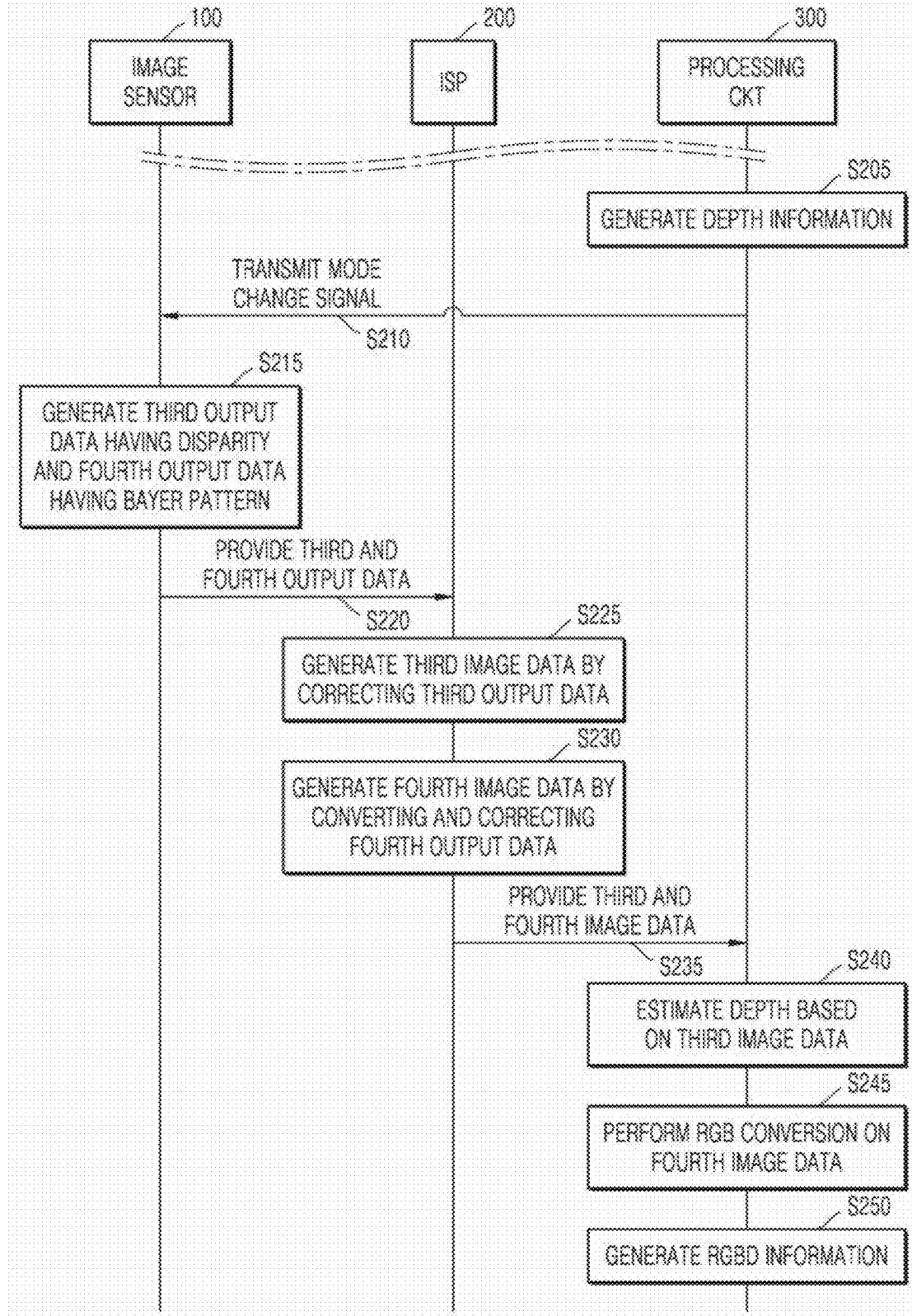

ELECTRONIC DEVICE FOR GENERATING DEPTH INFORMATION OF REGION OF INTEREST AND OPERATION METHOD THEREOF

CROSS-REFERENCE TO RELATED APPLICATION

This application is based on and claims priority under 35 U.S.C. § 119 to Korean Patent Application No. 10-2021-0063620, filed on May 17, 2021, in the Korean Intellectual Property Office, the disclosure of which is incorporated by reference herein in its entirety.

BACKGROUND

Example embodiments of the present disclosure relate to an electronic device for generating depth information of a region of interest (ROI) and an operation method thereof, and more particularly, an electronic device for determining an ROI by sensing an object through a dual pixel and generating depth information of the ROI, and an operation method of the electronic device.

As complementary metal-oxide semiconductor (CMOS) image sensors are installed in a wide variety of portable electronic devices, clear images are required even in various imaging environments. In order to capture a clear image in a low-light environment, more accurate depth information of an object is required. Although time of flight (TOF) sensors are generally used to obtain depth information, the TOF sensors have drawbacks in that they occupy a lot of space and are expensive and have a high power consumption, and general red-green-blue (RGB)-based CMOS image sensors are vulnerable to a low-light environment.

A dual pixel that consists of a pair of two photoelectric conversion elements sharing one micro-lens is used to offer auto focusing and obtain depth information. As compared to a dual camera composed of different image sensors, a dual pixel included in the same image sensor has a short baseline, which is a distance between photoelectric conversion elements, and thus has a small disparity, thereby making it difficult to accurately estimate depth information.

SUMMARY

One or more example embodiments of the present disclosure provide an electronic device and an operation method thereof, which are capable of reducing the amount of data processing required for depth estimation by sensing only a region of interest (ROI).

According to an aspect of an example embodiment, there is provided an electronic device including a camera module configured to sense an object based on a plurality of photoelectric conversion elements and generate stereo image data having a disparity based on at least two of the plurality of photoelectric conversion elements sharing a micro lens, a memory configured to store at least one instruction and the stereo image data, and a processing circuit configured to execute the at least one instruction to detect an object of interest based on the stereo image data, and generate a crop signal for instructing the camera module to sense a region of interest including the object of interest; and generate depth information based on the stereo image data.

According to another aspect of an example embodiment, there is provided an electronic device including a camera module configured to generate stereo image data including first image data and second image data having a disparity with respect to an object, a memory configured to store at least one instruction and the stereo image data, and a processing circuit configured to execute the at least one instruction to detect an object of interest in the first image data, and generate a crop signal configured to instruct sensing of a region of interest including the object of interest, wherein the camera module is further configured to generate, based on the crop signal, partial stereo image data including first partial image data and second partial image data having a disparity with respect to the object of interest, and wherein the processing circuit is further configured to generate depth information based on the partial stereo image data.

According to another aspect of an example embodiment, there is provided an operation method of an electronic device including a camera module and a processing circuit, the operation method including generating stereo image data having a disparity based on two photoelectric conversion elements sharing a micro lens, detecting an object of interest in the stereo image data, generating partial stereo image data for a region of interest including the object of interest, and generating depth information by estimating a depth based on the partial stereo image data.

BRIEF DESCRIPTION OF THE DRAWINGS

The above and/or other aspects, features, and advantages of example embodiments of the disclosure will be more apparent from the following description taken in conjunction with the accompanying drawings, in which:

FIGS. 10A, 10B, and 10C are diagrams for describing structures and operations of artificial neural networks;

FIGS. 15A and 15B are flowcharts of operation methods of an electronic device according to example embodiments;

DETAILED DESCRIPTION OF THE EMBODIMENTS

Hereinafter, example embodiments will be described in detail with reference to the accompanying drawings.

Figure 1:
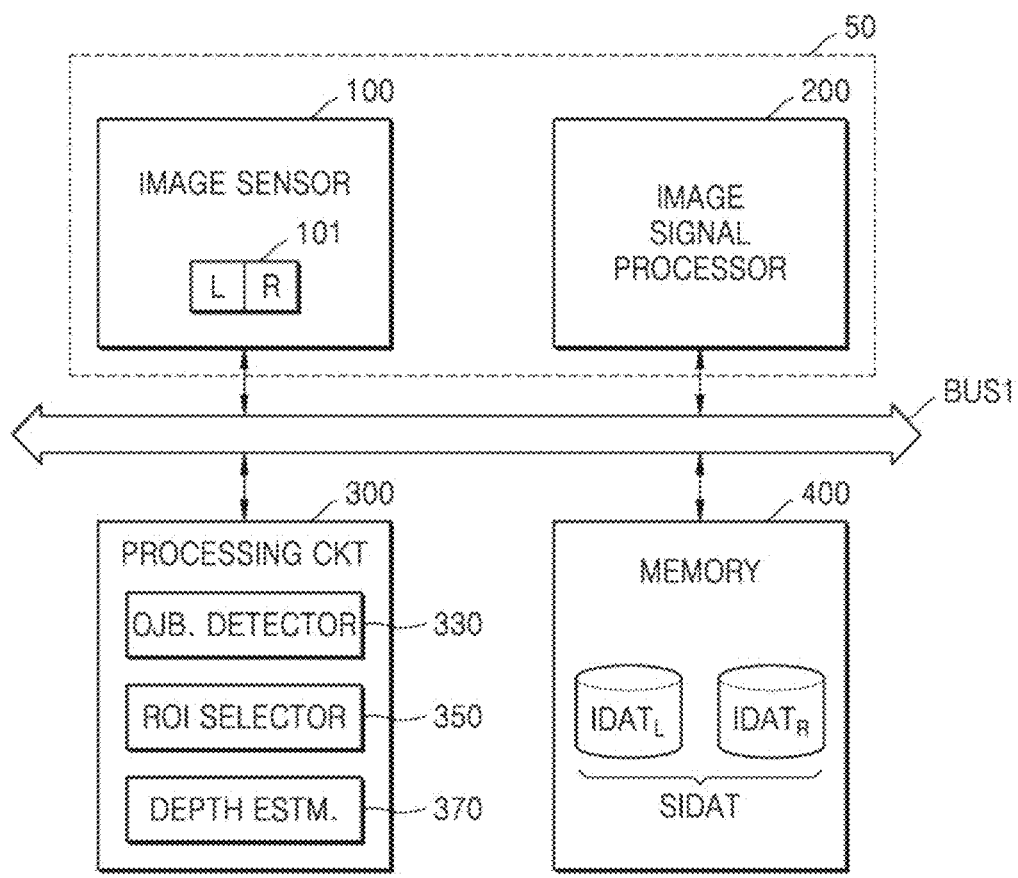
FIG. 1 is a block diagram of an electronic device according to an example embodiment.

FIG. 1 is a block diagram of an electronic device 10 according to an example embodiment.

Referring to FIG. 1, the electronic device 10 may include an image sensor 100 including a dual pixel 101, an image signal processor (ISP) 200, a processing circuit 300, and a memory 400, and each of components thereof may communicate with each other, or control signals, data, and/or power may be provided to each component via a first bus BUS1. The image sensor 100 and the ISP 200 may be collectively referred to as a camera module 50.

The electronic device 10 may process data via interaction between hardware and software and provide a processing result to a user. The electronic device 10 may provide a physical basis on which software may be executed, and derive a result intended by the user by using hardware resources. In an example embodiment, the electronic device 10 may execute application software through an operating system (OS) and store a computation result from the execution in the memory 400, and in this case, the electronic device 10 may be referred to as a computing system.

Examples of the electronic device 10 may include digital cameras, smartphones, wearable devices, Internet of Things (IoT) devices, tablet personal computers (PCs), personal digital assistants (PDAs), and portable multimedia players (PMPs), and navigation devices. In addition, the electronic device 10 may be provided as a component in vehicles, furniture, manufacturing equipment, doors, various measuring instruments, etc.

The image sensor 100 may be mounted on the electronic device 10 having an image or light sensing function. The image sensor 100 may convert optical signals from an object, which are received through an optical lens, into electrical signals, generate image data based on the electrical signals, and output the image data to the outside. For example, the image data may be output to the ISP 200. The image sensor 100 may include, for example, a pixel array including a plurality of pixels arranged in two dimension (2D) and a readout circuit, and the pixel array may convert the received optical signals into electrical signals.

In an example embodiment, the pixel array may be implemented with photoelectric conversion elements such as charge coupled devices (CCDs) or complementary metal oxide semiconductors (CMOS), and it may be implemented with various other types of photoelectric conversion elements. A photoelectric conversion element may generate a photocharge that varies with the intensity of incident light. Examples of the photoelectric conversion element may include a photodiode (PD), a phototransistor, a photogate, or a pinned PD. For example, a PD is a P-N junction diode, and may generate an electric charge, i.e., an electron with a negative charge and a hole with a positive charge, in proportion to the amount of incident light.

A micro lens and a color filter may be stacked on each of the plurality of pixels. In an example embodiment, each of the plurality of pixels may sense an object by using at least two photoelectric conversion elements. According to an example embodiment, the dual pixel 101 includes two photoelectric conversion elements sharing one micro lens.

The dual pixel 101 may include a pair of photoelectric conversion elements arranged horizontally or vertically. In an example embodiment, the dual pixel 101 may include at least one first photoelectric conversion element L located in a left direction (or upward direction) relative to an optical axis of the micro lens and at least one second photoelectric conversion element R located in a right direction (or downward direction) relative to the optical axis thereof.

The dual pixel 101 may output a first image signal generated in the first photoelectric conversion element L or a second image signal generated in the second photoelectric conversion element R. A disparity, which is a phase difference between the first and second image signals from the same object respectively sensed by the pair of first and second photoelectric conversion elements L and R, may be included in image data output from the camera module 50. The image sensor 100 including the dual pixel 101 or the camera module 50 including the image sensor 100 may estimate a depth that is a distance between the object and the dual pixel 101 by using a disparity, or automatically detect a focal point based on the phase difference between the first and second image signals. A structure of the dual pixel 101 will be described in more detail with reference to FIGS. 3A through 3C.

The readout circuit may output, as output data, data that has undergone preprocessing such as bad pixel removal based on electrical signals provided by the pixel array. The image sensor 100 may be implemented as a semiconductor chip or package including the pixel array and the readout circuit.

The ISP 200 may perform image processing and correction on the output data provided by the image sensor 100, and may output image data IDAT as the result. For example, the image processing performed by the ISP 200 may include image processing for converting the output data to a new data format, for example, converting image data having a Bayer pattern to a YUV or RGB format, and image processing for improving image quality, such as noise removal, brightness adjustment, sharpness adjustment, etc. A structure of the ISP 200 will be described in more detail below with reference to FIG. 5.

The ISP 200 may generate the image data IDAT as a result of processing the output data. The image data IDAT may include luminance data YDAT representing the intensity of light or brightness in a scene, and pieces of chrominance data UDAT and VDAT representing a color difference that is a geometric distance between two points in a color space designed to express the scene. The image data IDAT may be stored in the memory 400.

According to an example embodiment, the ISP 200 may generate stereo image data SIDAT including first image data $IDAT_L$ and second image data $IDAT_R$ by processing and correcting pieces of output data sensed from the dual pixel 101. For example, the ISP 200 may generate the first image data $IDAT_L$ by processing and correcting a first image signal sensed by the first photoelectric conversion element L and the second image data $IDAT_R$ by processing and correcting a second image signal sensed by the second photoelectric conversion element R.

The camera module 50 may include the image sensor 100 and the ISP 200. The camera module 50 may be an integrated component that processes and corrects image signals generated by the image sensor 100 and converts the image signals into image data IDAT to be suitable for processing in a mobile electronic device including a smartphone. The camera module 50 may be standardized so that it may be smoothly operated even in the electronic device 10 including the processing circuit 300 produced by different manufacturers.

The processing circuit 300 may control all operations of the electronic device 10, and more particularly, process requests from other components, for example, the image sensor 100, the ISP 200, and the memory 400, constituting the electronic device 10 and control the other components. In an example embodiment, the processing circuit 300 may perform a particular task, an instruction, or an operation. In an example embodiment, the instruction may be loaded from the memory 400.

In an example embodiment, the processing circuit 300 may be implemented as a general-purpose processor, a dedicated processor, or an application processor (AP). In an example embodiment, the processing circuit 300 may be implemented as computing processors, for example, a central processing unit (CPU), a graphics processing unit (GPU), a neural processing unit (NPU), an AP, etc., including a dedicated logic circuit, for example, a field programmable gate array (FPGA), application specific integrated circuits (ASICs), etc., but is not limited thereto.

The processing circuit 300 may further include an accelerator, which is a dedicated circuit for high-speed data computations such as artificial intelligence (AI) data computations, and the accelerator may include a GPU, an NPU and/or a digital signal processor (DSP). According to an example embodiment, the accelerator may be implemented as a separate chip physically independent of other components of the processing circuit 300. According to an example embodiment, the processing circuit 300 may process data by using one or more artificial neural networks. In addition, the processing circuit 300 may reinforce the one or more artificial neural networks by allowing them to learn data.

According to an example embodiment, functions related to AI may be performed via the processing circuit 300 and the memory 400. The processing circuit 300 may be a general-purpose processor such as a CPU, an AP, or a DSP, a dedicated graphics processor such as a GPU or a vision processing unit (VPU), or a dedicated AI processor such as an NPU. The processing circuit 300 may control input data to be processed according to predefined operation rules or an AI model stored in the memory 400. When the processing circuit 300 is a dedicated AI processor, the dedicated AI processor may be designed with a hardware structure specialized for processing a particular AI model. The predefined operation rules or AI model may be created via a training process. The creation via the training process indicates that the predefined operation rules or AI model set to perform desired characteristics or purpose are created by training a basic AI model on a large number of training data via a learning algorithm. The training process may be performed by an apparatus itself in which AI is performed or via a separate server and/or system. Examples of a learning algorithm may include, but are not limited to, supervised learning, unsupervised learning, semi-supervised learning, and reinforcement learning.

An artificial neural network may include a deep neural network (DNN) and may be, for example, a convolutional neural network (CNN), a DNN, a recurrent neural network (RNN), a restricted Boltzmann machine (RBM), a deep belief network (DBN), a bidirectional recurrent DNN (BRDNN), or deep Q-networks (DQN) but is not limited thereto.

The artificial neural network may include a plurality of neural network layers. Each of the neural network layers has a plurality of weight values and may perform neural network computations via calculations between a result of computations in a previous layer and a plurality of weight values. A plurality of weight values assigned to each of the neural network layers may be optimized based on a result of training an AI model. For example, a plurality of weight values may be updated to reduce or minimize a loss or cost value obtained in the AI model during a training process. The artificial neural network will be described in more detail below with reference to FIGS. 10A through 10C.

According to an example embodiment, the processing circuit 300 may include an object detector 330, a region of interest (ROI) selector 350, and a depth estimator 370.

The object detector 330 may sense a scene including a target object as a whole, and detect each of at least one object included in the scene. The object detector 330 may utilize object detection methods in the field of computer vision. For example, the object detector 330 may identify objects in a scene by using bounding boxes, and detect an object by using handcrafted feature-based object detection, by which objects are individually classified using labeled ground truth information for each object, or an AI-based object detection method exploiting an artificial neural network designed for object detection. The object detector 330 may detect an object of interest (OOI) in at least one object.

The ROI selector 350 may determine an ROI including the OOI. According to an example embodiment, the ROI selector 350 may identify a region corresponding to an OOI detected in a scene and select an ROI including the OOI. For example, an ROI may be larger than a bounding box in which an OOI is detected.

The depth estimator 370 may estimate an absolute depth or a relative depth. In an example embodiment, the depth estimator 370 may extract, via an artificial neural network, features from an input image, such as borders, lines, colors, edges (boundaries of an object), density (including dense and sparse), depth, etc. In an example embodiment, a dense image will be referred to as a textured image, and a sparse image will be referred to as an untextured image. A textured image and an untextured image may correspond to a high-frequency and a low-frequency, respectively. The depth estimator 370 may estimate an absolute depth by extracting features from an input image.

In an example embodiment, the depth estimator 370 may process an input image using an artificial neural network configured to learn all features of a scene. A scene network (S.NET), which is an artificial neural network that learns all features of a scene, may be implemented with a pyramid structure. According to an example embodiment, a S.NET module (375 of FIG. 7) may encode a scene corresponding to image data while gradually decreasing a resolution of the scene, and decode the scene while gradually increasing the resolution back to an original resolution. According to an example embodiment, the depth estimator 370 may estimate a relative depth of an input image by using the S.NET.

The memory 400 may store data generated or processed by the image sensor 100, the ISP 200, and/or the processing circuit 300, and provide the stored data to the ISP 200 and/or the processing circuit 300. The memory 400 may store an operating system (OS) of the electronic device 10, applications, and instructions for processing operations.

According to an example embodiment, the memory 400 may be a working memory that exchanges data with the processing circuit 300 in real-time. For example, the memory 400 may be a volatile memory including dynamic random access memory (DRAM), static RAM (SRAM), mobile DRAM, double data rate synchronous DRAM (DDR SDRAM), low power DDR (LPDDR), graphic DDR (GDDR) SDRAM, Rambus DRAM (RDRAM), etc. However, this is merely an example embodiment, and the memory 400 may include a non-volatile memory.

For example, the memory 400 may be a storage device for storing data generated or processed by the image sensor 100, the ISP 200, and/or the processing circuit 300 in a non-volatile manner. In an example embodiment, the memory 400 may be a non-volatile memory including electrically erasable programmable read-only memory (EEPROM), a flash memory, phase change RAM (PRAM), and resistance RAM (RRAM), nano-floating gate memory (NFGM), polymer RAM (PoRAM), magnetic RAM (MRAM), ferroelectric RAM (FRAM), etc.

According to an example embodiment, the memory 400 may store the stereo image data SIDAT. The stereo image data SIDAT may be a pair of pieces of image data having a disparity, which are generated by the dual pixel 101. In an example embodiment, the stereo image data SIDAT may include first image data $IDAT_L$ that is left image data sensed by the first photoelectric conversion element L that is a left PD in the dual pixel 101 including a pair of left and right PDs, and second image data $IDAT_R$ that is right image data sensed by the second photoelectric conversion element R that is the right PD.

The stereo image data SIDAT may include raw data of an object sensed as a Bayer pattern, or data partially corrected and post-processed by the image sensor 100 or the ISP 200. For example, the stereo image data SIDAT may include pieces of data in a YUV format conforming to a YUV color space. The pieces of data in the YUV format may include luminance data YDAT and pieces of chrominance data UDAT and VDAT. The luminance data YDAT and the pieces of chrominance data UDAT and VDAT may be generated by the ISP 200 as part of image data conforming to the YUV format. The luminance data YDAT and the pieces of chrominance data UDAT and VDAT may be separately stored in logically or physically separate spaces within the memory 400. According to an example embodiment, the processing circuit 300 may use only the luminance data YDAT among the image data in the YUV format.

A first bus BUS1 may relay data communication with the image sensor 100, the ISP 200, the processing circuit 300, and the memory 400. In an example embodiment, the first bus BUS1 may include different types of buses such as a control bus, a data bus, and an address bus to relay transmission or reception of control signals, data, and addresses from or to the image sensor 100, the ISP 200, the processing circuit 300, and the memory 400.

The electronic device 10 including the image sensor 100, the ISP 200, the processing circuit 300, the memory 400, and the first bus BUS1 may be implemented as a system-on-chip (SoC). The SoC is a single semiconductor chip including a plurality of hardware modules necessary for driving the electronic device 10. In an example embodiment, the SoC may integrate a combination of applications necessary to perform respective functions of the hardware modules with embedded software onto the single chip. An application (or program) may be application software for achieving a particular purpose. According to an example embodiment, an application may be executed using at least one function. An application may be built by executing source code. Using an SoC may reduce a space needed for mounting components on a substrate, thus enabling miniaturization of a product, and lower manufacturing costs compared to when separately producing various functional elements.

According to an example embodiment, the electronic device 10 may detect an OOI based on an image signal output from either one of the first and second photoelectric conversion elements L and R. According to an example embodiment, the camera module 50 may sense a scene including a target object as a whole by using the dual pixel 101, and the memory 400 may store the first image data $IDAT_L$ sensed by the first photoelectric conversion element L and then corrected by the ISP 200, as well as the second image data $IDAT_R$ sensed by the second photoelectric conversion element R and then corrected by the ISP 200. The processing circuit 300 may detect an OOI included in the scene by using either of the stereo image data SIDAT stored in the memory 400, for example, the first image data $IDAT_L$. Thus, according to an example embodiment, the electronic device 10 may use only one piece of image data instead of the stereo image data SIDAT for the entire scene, thereby reducing the amount of data processing.

According to an example embodiment, the electronic device 10 may sense only an ROI to thereby reduce the amount of data processing required for depth estimation. Accordingly, power consumption of the electronic device 10 may be reduced, and a data processing speed may be improved.

Furthermore, according to an example embodiment, the electronic device 10 may allow an artificial neural network to learn only luminance data among YUV data, thereby reducing memory usage and power consumption and improving the accuracy of depth estimation even in a low-light environment.

Figure 2:
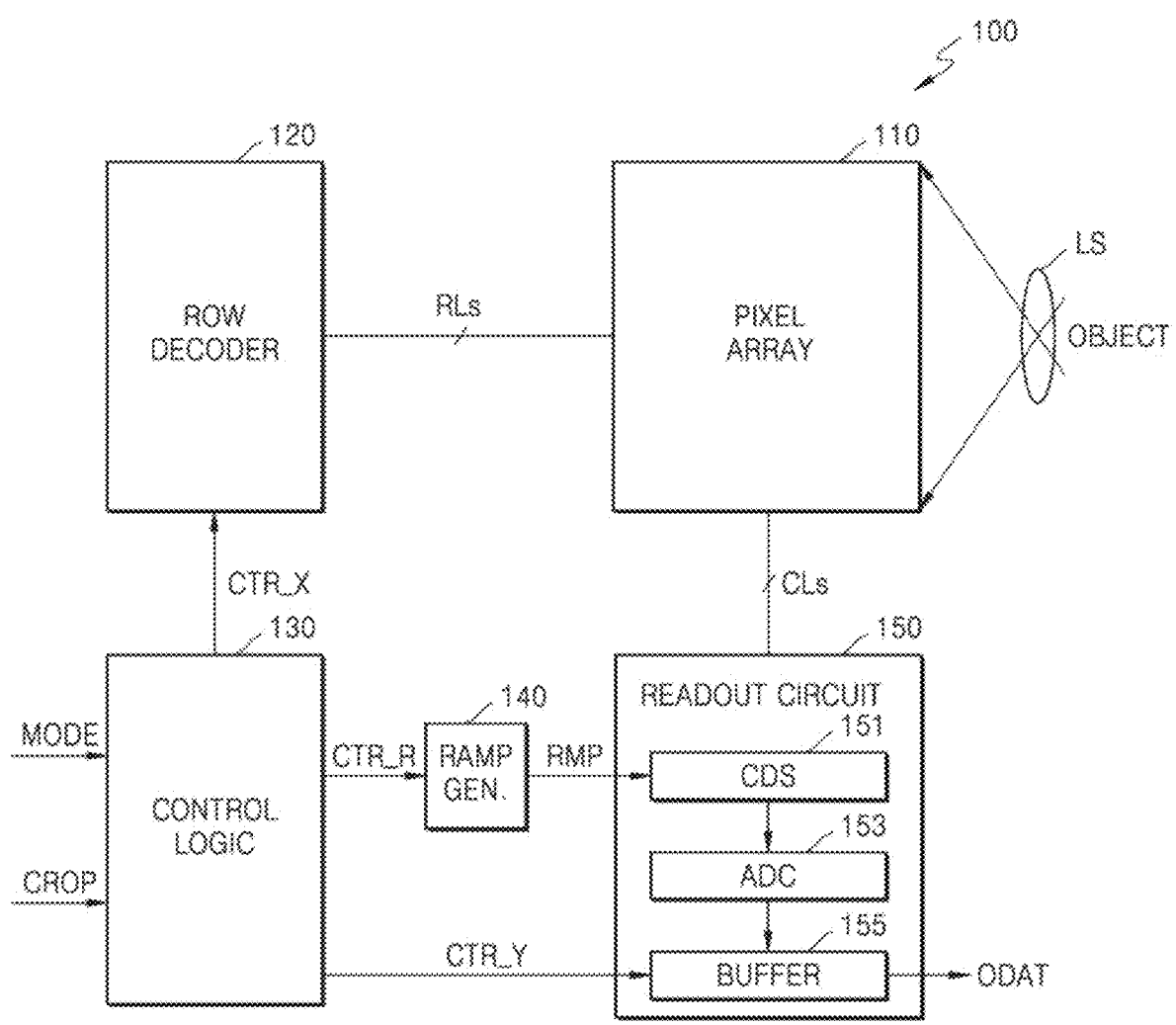
FIG. 2 is a detailed block diagram of an image sensor shown in FIG. 1.

FIG. 2 is a detailed block diagram of an image sensor 100 in FIG. 1.

The image sensor 100 may be mounted on an electronic device having an image or light sensing function. For example, the image sensor 100 may be mounted on an electronic device such as a camera, a smartphone, a wearable device, an IOT device, a home appliance, a tablet PC, a PDA, a PMP, a multimedia player, a navigation device, a drone, an advanced driver assistance system (ADAS), etc. Furthermore, the image sensor 100 may be mounted in an electronic device provided as a part in vehicles, furniture, manufacturing equipment, doors, various measuring instruments, etc.

Referring to FIG. 2, the image sensor 100 may include a lens LS, a pixel array 110, a row decoder 120, a control logic 130, a ramp generator 140, and a readout circuit 150. It should be understood that the image sensor 100 may further include a clock signal generator, a signal processor, a column decoder, and/or a memory.

The image sensor 100 may convert optical signals from an object, which are received via an optical device, into electrical signals, and generate image data IDAT based on the electrical signals. The optical device may be an optical light-collecting device including a mirror and a lens LS. For example, the image sensor 100 may use an optical device configured to condense various paths of light reflected from the object or changing a path in which light travels by using optical characteristics such as dispersion or refraction of the light. In an example embodiment, for convenience of description, it is assumed that the lens LS is used, but embodiments are not limited thereto, and various optical devices as described above may be used.

A pixel array 110 may be a CMOS image sensor (CIS) that converts optical signals into electrical signals. An optical signal passing through the lens LS may reach a light-receiving surface of the pixel array 110 to form an image of the object. The pixel array 110 may adjust the sensitivity of the optical signal according to control by the control logic 130.

The pixel array 110 may be connected to a plurality of row lines RLs and a plurality of column lines CLs that transmit signals to a number of pixels arranged in a matrix form. For example, each of the row lines RLs may transmit control signals output from the row decoder 120 respectively to transistors included in a corresponding pixel, and each of the column lines CLs may transmit, to the readout circuit 150, a pixel signal of pixels corresponding to each column in the pixel array 110. Each of the column lines CLs may extend in a column direction, and connect pixels in the same column to the readout circuit 150.

Each of a plurality of pixels in the pixel array 110 may include at least one photoelectric conversion element and at least one transistor. For example, the pixel array 110 may be implemented with photoelectric conversion elements (or photo-sensitive elements) such as CCDs or CMOS, or various other types of photoelectric conversion elements. According to an example embodiment, a photoelectric conversion element may sense light and convert the sensed light into a photocharge. For example, a photoelectric conversion element may be a photo-sensitive element composed of an organic or inorganic material, such as an inorganic PD, an organic PD, a perovskite PD, a phototransistor, a photogate, or a pinned PD. In an example embodiment, a transistor may transfer an electric charge stored in a photoelectric conversion element, reset a voltage to a power supply voltage, or convert the electric charge into an electrical signal.

A micro lens and a color filter may be stacked on each of the pixels, and the plurality of color filters corresponding to the pixels may constitute a color filter array. A color filter may transmit light of a particular color among pieces of light incident through the micro lens, i.e., a wavelength in a particular color region. A color detectable at a pixel may be determined according to a color filter provided in the pixel. However, embodiments are not limited thereto, and in an example embodiment, a photoelectric conversion element provided in a pixel may convert light corresponding to a wavelength in a color region into an electric signal according to a level of an applied electrical signal, for example, a voltage level, and thus, a color detectable at the pixel may be determined according to the level of the electrical signal applied to the photoelectric conversion element.

In an example embodiment, each of the pixels in the pixel array 110 may include a micro lens and at least one photoelectric conversion element arranged in parallel below the micro lens. Each of the pixels may sense an object by using at least one dual pixel 101. In an example embodiment, the dual pixel 101 may include the at least one first photoelectric conversion element L located in a left direction (or upward direction) relative to an optical axis of the micro lens and the at least one second photoelectric conversion element R located in a right direction (or downward direction) relative to the optical axis thereof. In addition, a pixel may output a summation image signal that is the sum of image signals respectively generated in the first and second photoelectric conversion elements L and R.

The plurality of pixels may include color pixels such as a red pixel, a green pixel, and a blue pixel. A color pixel may generate an image signal including corresponding color information based on light passing through different color filters. In an example embodiment, a color filter for generating different color information, or a color pixel or a set of color pixels for generating an image signal including different color information is referred to as a color channel. For example, a red channel may refer to a red filter itself or a red pixel that is a pixel that processes light transmitted through the red filter, a blue channel may refer to a blue filter itself or a blue pixel that processes light transmitted through the blue filter, and a green channel may refer to a green filter itself or a green pixel that processes light transmitted through the green filter. Although red, green, and blue colors are used in an example embodiment, the plurality of pixels may include pixels combined in different colors, such as a yellow pixel, a cyan pixel, and a white pixel.

The red pixel may generate an image signal (or electric charges) corresponding to a red color signal in response to wavelengths in a red region of the visible light spectrum. The green pixel may generate an image signal (or electric charges) corresponding to a green color signal in response to wavelengths in a green region of the visible light spectrum. The blue pixel may generate an image signal (or electric charges) corresponding to a blue color signal in response to wavelengths in a blue region of the visible light spectrum. However, embodiments are not limited thereto, and the plurality of pixels may further include a white pixel. As another example, the plurality of pixels may include a cyan pixel, a yellow pixel, a magenta pixel, or a white pixel.

The row decoder 120 may generate control signals for driving the pixel array 110 according to control by the control logic 130 (a row control signal CTR_X), and drive the plurality of pixels in the pixel array 110 on a row-by-row basis via the row lines RLs. Each of the row lines RLs may extend in a row direction and may be connected to pixels arranged in the same row.

In an example embodiment, the row decoder 120 may control the plurality of pixels in the pixel array 110 to detect incident light simultaneously or on a row-by-row basis. Furthermore, the row decoder 120 may select pixels from among the plurality of pixels on a row-by-row basis, provide a reset signal to the selected pixels, for example, one row of pixels, to reset the pixels, and control a sensing voltage generated by the selected pixels to be output via the column lines CLs.

The control logic 130 may provide control signals for controlling timings of the row decoder 120, the ramp generator 140, and the readout circuit 150. For example, the control logic 130 may provide a row control signal CTR_X to the row decoder 120, and the row decoder 120 may sense, based on the row control signal CTR_X, the pixel array 110 for each row via the row lines RLs. For example, the control logic 130 may provide a ramp control signal CTR_R for controlling a ramp signal RMP to the ramp generator 140, and the ramp generator 140 may generate, based on the ramp control signal CTR_R, a ramp signal RMP for the operation of the readout circuit 150. For example, the control logic 130 may provide a column control signal CTR_Y to the readout circuit 150, and the readout circuit 150 may receive and process pixel signals from the pixel array 110 via the column lines CLs, based on the column control signal CTR_Y.

According to an example embodiment, the control logic 130 may control all operations of the image sensor 100 based on a mode signal MODE. According to an example embodiment, the electronic device 10 may sense and process an object according to a plurality of operating modes.

For example, the electronic device 10 may support, as an operating mode, a first mode in which stereo image data (SIDAT of FIG. 1) are generated using the dual pixel 101. Furthermore, the electronic device 10 may support a second mode in which single image data is generated based on an image signal from one photoelectric conversion element provided in a single pixel instead of using the dual pixel 101, or in which image data is generated using the dual pixel 101, i. e., by summing image signals from a plurality of photoelectric conversion elements included in the dual pixel 101. The second mode is a mode in which a disparity is not detected, and may also be referred to as a floating diffusion (FD) sharing mode in which pixels share an FD node.

In addition, the electronic device 10 may support a third mode in which stereo luminance data sensed from the dual pixel 101 is generated in addition to single image data based on an image signal from one photoelectric conversion element. Here, the stereo luminance data may include first luminance data generated by the first photoelectric conversion element L in the dual pixel 101 and second luminance data generated by the second photoelectric conversion element R therein.

In order to operate in first through third modes according to control by the control logic 130, the image sensor 100 may selectively use the dual pixel 101 to sense an object, sum together image signals sensed by at least two photoelectric conversion elements, sense luminance data by processing sensed data, or generate luminance data and a summation image signal.

In an example embodiment, the control logic 130 may receive a mode signal MODE from an AP and control a row control signal CTR_X, a column control signal CTR_Y, and a ramp control signal CTR_R so that each of the plurality of pixels in the pixel array 110 independently outputs a pixel signal, the pixel array 110 may output a plurality of pixel signals based on the row control signal CTR_X and the column control signal CTR_Y, and the readout circuit 150 may sample and process the pixel signals based on a ramp signal RMP. For example, the AP may provide, as the mode signal MODE, a result of determining an imaging mode of the image sensor 100 according to various scenarios, such as the illumination of an imaging environment, a user's resolution setting, a sensed or learned state, etc.

The control logic 130 may also receive a crop signal CROP and provide the crop signal CROP to the image sensor 100 which senses a region corresponding to or including an OOI. For example, the image sensor 100 may adjust a focal length of the lens LS or the row control signal CTR_X and the column control signal CTR_Y to sense only a region corresponding to an ROI in a scene. In an example embodiment, the image sensor 100 may sense only an ROI based on the crop signal CROP, thereby improving a processing speed and reducing power consumption due to a relatively small amount of data processing, while maintaining a previous high resolution.

The control logic 130 may be implemented as a processing circuit such as hardware including a logic circuit, or a combination of hardware and software, such as a processor executing software for performing a compression operation. In particular, the control logic 130 may be implemented as a CPU included in the image sensor 100, an arithmetic logic unit (ALU) that performs arithmetic and logic operations, a bit shift, etc., a DSP, a microprocessor, an ASIC, a control logic, etc., but is not limited thereto, and an accelerator assisting an artificial neural network or the like or using the artificial neural network itself, an NPU, etc. may be further used as the control logic 130.

The ramp generator 140 may generate a ramp signal RMP that gradually increases or decreases with a certain slope, and provide the ramp signal RMP to the readout circuit 150.

The readout circuit 150 may receive a pixel signal output from the pixel array 110 via the column lines CLs, process the pixel signal, and output a resulting signal as output data ODAT. The readout circuit 150 may include a correlated double sampling (CDS) circuit 151, an analog-to-digital converting (ADC) circuit 153, and a buffer 155.

The CDS circuit 151 may include a plurality of comparators and compare each of the pixel signals received from the pixel array 110 via the column lines CLs with a ramp signal RMP from the ramp generator 140. A comparator may compare a received pixel signal with a buffered ramp signal RMP and output a comparison result as logic low or logic high. For example, a comparator may output a comparison signal that transitions from a first level, for example, logic-high, to a second level, for example, logic-low, when a level of a ramp signal RAMP is equal to a level of a pixel signal, and a time point at which the level of the comparison signal transitions may be determined according to the level of the pixel signal.

A plurality of pixel signals output from a plurality of pixels may have an offset due to unique characteristics of each pixel, for example, fixed pattern noise (FPN), etc., and/or an offset due to a difference in characteristics of logic elements for outputting a pixel signal from a corresponding pixel, for example, transistors for outputting electric charges stored in a photoelectric conversion element in the pixel. To compensate for such an offset among the pixel signals output via the column lines CLs, a technique, called correlated double sampling (CDS), is used. The CDS technique indicates obtaining a reset voltage (or a reset component) and a sensing voltage (or a sensing component) and extracting a difference between the reset voltage and the sensing voltage, for example, a voltage difference, as an effective signal component. A comparator may output a comparison result, for example, a comparison output, to which the CDS technique is applied. Eventually, the CDS circuit 151 may generate the comparison result to which the CDS technique is applied.

The ADC circuit 153 may convert a comparison result from the CDS circuit 151 into digital data, thereby generating and outputting pixel values corresponding to a plurality of pixels on a row-by-row basis. The ADC circuit 153 may include a plurality of counters. The counters may be connected to respective outputs of the comparators, and count comparison results respectively output from the comparators. Each of the counters may count a comparison result of logic high or logic low output from a corresponding comparator based on a counting clock signal during a reset conversion interval for sensing a reset signal and an image conversion interval for sensing a sensing signal, and output digital data, for example, a pixel value, according to a counting result. Each of the counters may include a latch circuit and an arithmetic circuit. The latch circuit may latch a code value received as a counting clock signal at a time point when a level of a comparison signal received from a comparator transitions. The latch circuit may latch a code value corresponding to a reset signal, for example, a reset value, and a code value corresponding to an image signal, for example, an image signal value. The arithmetic circuit may perform an arithmetic operation on the reset value and the image signal value to generate an image signal value from which a reset level of a pixel is removed. The counter may output, as a pixel value, the image signal value from which the reset level is removed. However, embodiments are not limited thereto, and the counter may be implemented as an up-counter that sequentially increases a count value based on a counting clock signal and an arithmetic circuit, an up/down counter, or a bit-wise inversion counter.

The buffer 155 may store pixel values output from the ADC circuit 153. The buffer 155 may store a plurality of pieces of digital data, for example, pixel values, for each row. In an example embodiment, the buffer 155 may temporarily store and amplify the pieces of digital data output from the counters and then output the amplified pieces of digital data. In other words, the buffer 155 may be an output buffer. The buffer 155 may temporarily store the pieces of digital data respectively output from the counters and sequentially or selectively output the pieces of digital data to a sense amplifier, and the sense amplifier may amplify and output the received pieces of digital data. The buffer 155 may output amplified image data IDAT as output data ODAT based on a column control signal CTR_Y from a column decoder for selecting a column according to control by the control logic 130.

The buffer 155 may be implemented as SRAM, a latch, a flip-flop, or a combination thereof, but is not limited thereto. In an example embodiment, the buffer 155 may be included in the ADC circuit 153 as a memory.

In an example embodiment, the image sensor 100 may support an auto focusing (hereinafter, abbreviated as AF) function, and use phase detection AF technology for AF. The phase detection AF is a method of adjusting a focus by detecting a phase disparity in an image formed on the image sensor 100. In the phase detection AF, a phase difference increases in the case of front focusing and back focusing. In the phase detection AF, because a phase difference value and information about a direction in which a focus is achieved may be obtained based on the detected phase disparity, focusing is achieved by moving a focusing lens only once. For example, the image sensor 100 may pre-calculate a value of lens movement based on the phase difference and the information about the direction, and perform focusing by driving the focus lens once based on the value of lens movement. Thus, the image sensor 100 using the phase detection AF enables rapid focusing without blurring on a display of an electronic viewfinder.

Figure 3A:
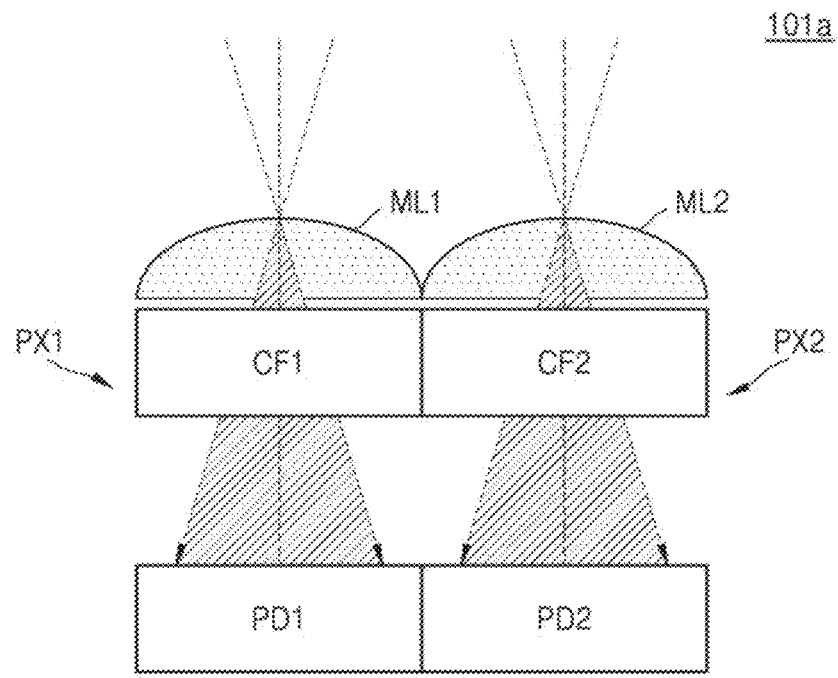
FIG. 3A is a diagram illustrating a structure of a pixel.
Figure 3B:
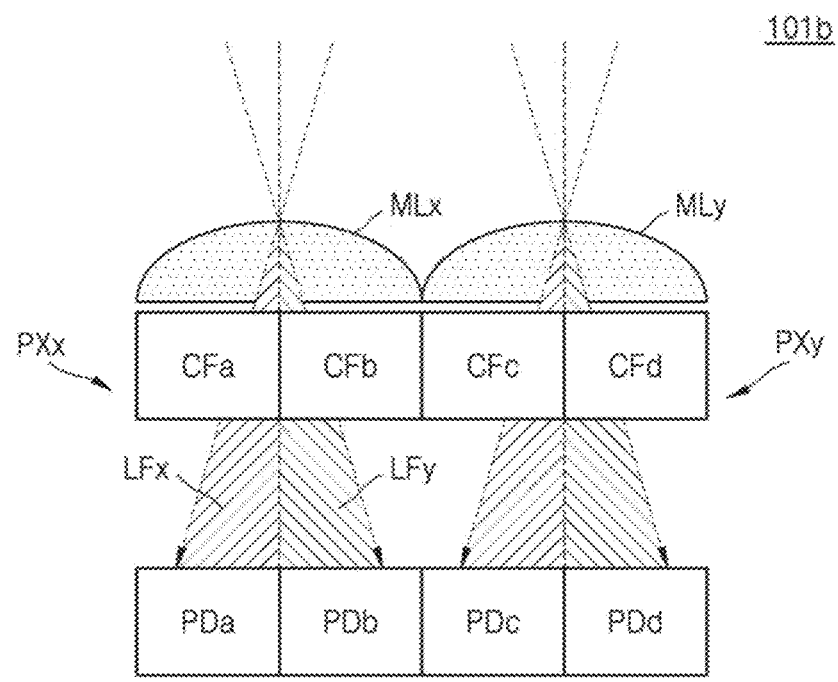
FIGS. 3B and 3C are diagrams illustrating a structure of a dual pixel according to an example embodiment.
Figure 3C:
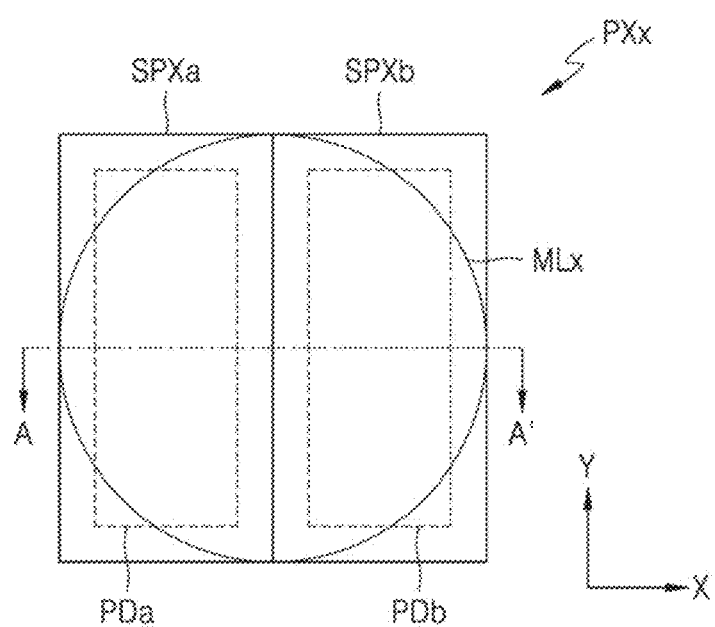

FIG. 3A is a diagram illustrating a structure of a pixel 101a, and FIGS. 3B and 3C are diagrams illustrating a structure of a dual pixel 101b according to an example embodiment. Repeated descriptions with respect to FIGS. 3A through 3C will be omitted.

Referring to FIG. 3A, the pixel 101a may include a micro lens, a photoelectric conversion element, and a color filter. For example, a pixel PX1 of a plurality of pixels PX1 and PX2 may include a PD PD1 as a photoelectric conversion element, a color filter CF1, and a micro lens ML1 above the color filter CFT. A pixel PX2 may include a PD PD2, a color filter CF2, and a micro lens ML2 above the color filter CF2. According to an example embodiment, a vertical cross-section of the micro lens ML1 or ML2 may have a shape of an arc with a curvature of a circle or may be a part of an ellipse.

According to the example embodiment illustrated in FIG. 3A, the color filter CFT or CF2 and the micro lens ML1 or ML2 may be arranged above the PD PD1 or PD2. For example, light incident at a center of the micro lens ML1 may pass through the color filter CFT so that only light in a particular wavelength range, for example, wavelengths of 500 nano-meter (nm) to 600 nm corresponding to a green color, is transmitted, and the transmitted light in the particular wavelength range may be imaged on the PD PD1. Similarly, light incident at the center of the micro lens ML2 may pass through the color filter CF2 so that only light having a particular wavelength is transmitted, and the transmitted light having the particular wavelength may be imaged on the PD PD2. As illustrated in FIG. 3A, when light incident on one micro lens, i.e., the micro lens ML1 or ML2, is imaged on one PD, i.e., the PD1 or PD2, it may be referred to as a single-PD. The image sensor (100 of FIG. 1) may determine a distance to an object by calculating a disparity caused by a phase difference between the PDs PD1 and PD2 by using the pixel 101a.

Referring to FIG. 3B, dual pixels 101b may each include a micro lens, a photoelectric conversion element, and a color filter. For example, a dual pixel PXx may include two color filters CFa and CFb, and first and second PDs PDa and PDb respectively corresponding to the two color filters CFa and CFb. Similarly, a dual pixel PXy may include two color filters CFc and CFd and third and fourth photodiodes PDc and PDd respectively corresponding to the two color filters CFc and CFd.

According to the example embodiment illustrated in FIG. 3B, the two color filters CFa and CFb and the first and second PDs PDa and PDb may be provided under one micro lens MLx. For example, first light flux LFx that is part of light incident at a center of the micro lens MLx may pass through the color filter CFa and be imaged on the first PD PDa, and second light flux LFy that is the remaining part of the incident light may pass through the color filter CFb and be imaged on the second PD PDb. A phenomenon similar to that occurring in the dual pixel PXx may occur in the dual pixel PXy. As illustrated in FIG. 3B, when light incident on one micro lens, i.e., the micro lens MLx or MLy, is imaged on two PDs, i.e., the first and second PDs PDa and PDb (or the third and fourth PDs PDc and PDd), it may be referred to as a dual-PD or the dual pixel (101 of FIG. 1).

FIG. 3C is a plan view of the dual pixel PXx of FIG. 3B. Referring to FIG. 3C, the dual pixel PXx may include the micro lens MLx and two sub-pixels, for example, a first sub-pixel SPXa and a second sub-pixel SPXb. The first sub-pixel SPXa and the second sub-pixel SPXb may be arranged side by side in a column direction, for example, a Y-axis direction (second direction). For example, the first sub-pixel SPXa may be located on a left side of the dual pixel PXx, and the second sub-pixel SPXb may be located on a right side of the dual pixel PXx. The first and second sub-pixels SPXa and SPXb may respectively include the first and second PDs PDa and PDb.

According to an example embodiment, sensing signals may be generated in the first and second PDs PDa and PDb. For example, first image signals and second image signals may be respectively output from the first and second sub-pixels SPXa and SPXb, and a disparity may be calculated by performing a phase difference operation based on the first and second image signals.

According to an example embodiment, an OOI may be detected using one of a plurality of photoelectric conversion elements, for example, one of the first and second PDs PDa and PDb or one of the third and fourth PDs PDc and PDd included in the dual pixel 101, for example, a pair of the first and second PDs PDa and PDb or a pair of the third and fourth PDs PDc and PDd. According to an example embodiment, the processing circuit (300 of FIG. 1) may generate the crop signal (CROP of FIG. 2) instructing sensing of an ROI including an OOI and provide the crop signal CROP to the image sensor (100 of the FIG. 1), and the image sensor 100 may sense only the ROI based on the crop signal CROP, thereby improving a processing speed and reducing power consumption due to a relatively small amount of data processing while maintaining the previous high resolution.

Figure 4A:
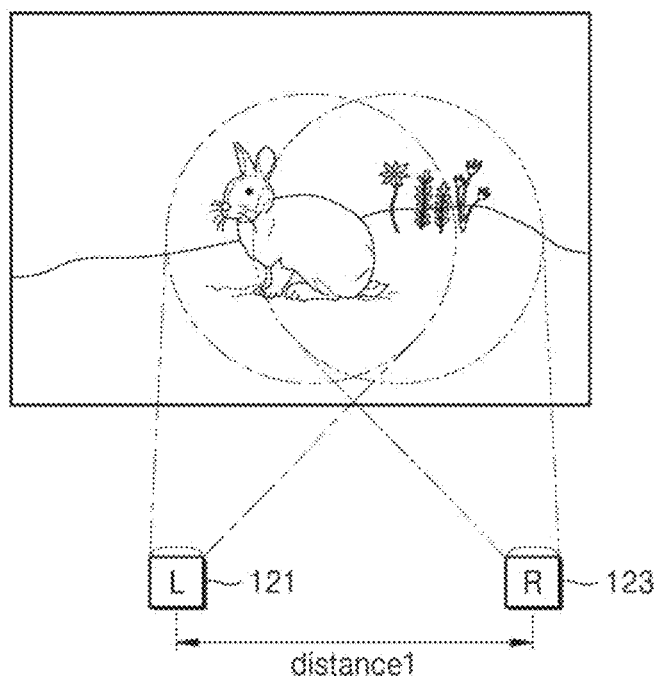
FIGS. 4A and 4B are diagrams illustrating a disparity difference for the same scene captured by different types of cameras according to an example embodiment.
Figure 4B:
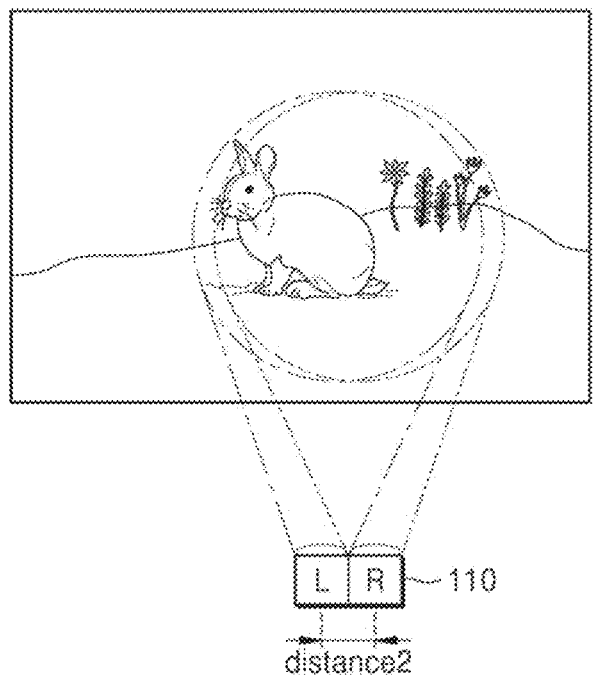

FIGS. 4A and 4B are diagrams illustrating a disparity difference for the same scene captured by different types of cameras according to an example embodiment.

FIG. 4A illustrates a scene sensed by different photoelectric conversion elements, i.e., fifth and sixth photoelectric conversion elements 121 and 123, included in different image sensors.

According to an example embodiment, the fifth and sixth photoelectric conversion elements 121 and 123 may each sense a rabbit which is an OOI among a plurality of objects included in the scene. The fifth photoelectric conversion element 121 may sense a region including the rabbit's right and left ears. Moreover, the sixth photoelectric conversion element 123 may sense only a region including only a body of the rabbit and not the ears of the rabbit. Because a baseline that is a distance between the fifth and sixth photoelectric conversion elements 121 and 123 is longer than a first distance distance1, the fifth and sixth photoelectric conversion elements 121 and 123 may have a relatively large disparity.

FIG. 4B illustrates a scene sensed by the dual pixel 110 included in the same image sensor. The dual pixel 101 may sense a rabbit that is an OOI among a plurality of objects included in the scene, but unlike in FIG. 4A, the dual pixel 101 may sense a region of the scene substantially close or similar to the entire OOI including the body and ears of the rabbit. The dual pixel 110 included in the same image sensor may have a relatively small disparity because a baseline that is a distance between photoelectric conversion elements L and R is a second distance distance2 that is shorter than the first distance distance1. Thus, it may be difficult for the image sensor 100 using the dual pixel 110 or the electronic device 10 including the image sensor 100 to accurately estimate depth information. In order to overcome this problem, example embodiments provide the electronic device 10 and an operation method thereof, which are capable of improving a processing speed and reducing power consumption due to a relatively small amount of data processing by sensing only an ROI, while maintaining the previous high resolution.

Figure 5:
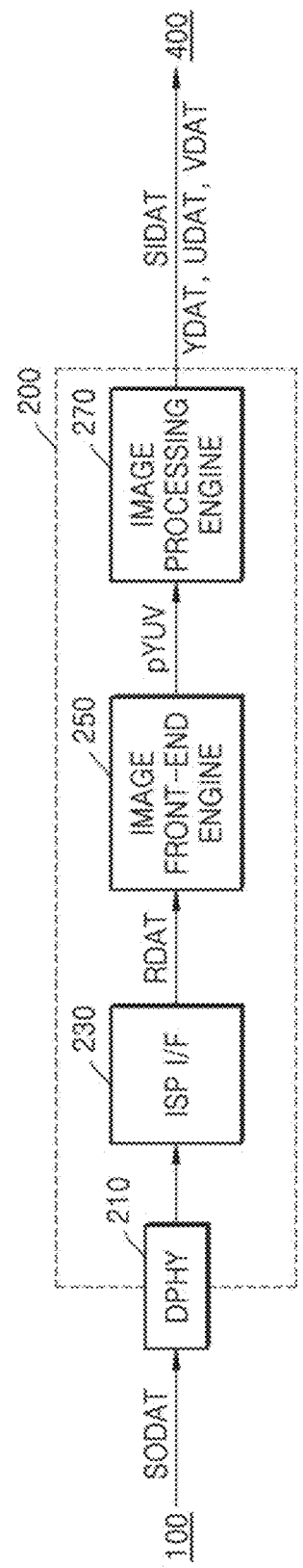
FIG. 5 is a detailed block diagram of an image signal processor according to an example embodiment.

FIG. 5 is a detailed block diagram of the ISP 200 according to an example embodiment.

Referring to FIG. 5, the ISP 200 may include a D-physical layer (DPHY) 210, an ISP I/F ISP I/F 230, an image front-end engine (IFE) 250, and an image processing engine (IPE) 270.

The DPHY 210 is a physical layer for an interface between the image sensor 100 and a display, and is a standardized interface established by the mobile industry processor interface (MIPI) alliance. The DPHY 210 may transmit output data ODAT to the ISP 200. The output data ODAT may include stereo output data SODAT generated in the dual pixel (101 of FIG. 1). The output data ODAT may be provided from the image sensor 100 to the ISP 200. In this case, the ISP 200 may be referred to as a camera subsystem, and in particular, may be compliant with Camera Serial Interface-2 defined by the MIPI Alliance (MIPI-CSI-2).

The ISP I/F 230 may route data streams from a plurality of CSI decoders. The ISP I/F 230 may route raw data RDAT provided via the DPHY 210 to the IFE 250.

The IFE 250 may receive the raw data RDAT and output pre-YUV data pYUV. According to an example embodiment, the IFE 250 may perform image processing operations such as collecting statistics related to Auto Exposure (AE) noise, AF noise, and auto white balance (AWB) noise. In addition, the IFE 250 may perform various image processing operations such as defective pixel correction, offset correction, lens distortion correction, color gain correction, green imbalance correction, etc.

The IPE 270 may include a CPU, a microprocessor, or a micro controller unit (MCU). The IPE 270 may perform image post-processing on input data. Post-processing may refer to a series of subsequent processing operations for reducing errors and distortions based on sensed image data. Post-processing performed by the IPE 270 may indicate application of an image enhancement algorithm to image artifacts.

In an example embodiment, data processed by the IPE 270 may be stored in the memory 400 as image data IDAT. For example, luminance data YDAT and pieces of chrominance data UDAT and VDATA obtained by changing a data format of pre-YUV data pYUV may be stored in the memory 400. In addition, frames subjected to image processing (hereinafter, referred to as converted image data) and/or result data (statistical data, histogram, etc.) generated by performing image processing may be further stored in the memory 400. When the stereo output data SODAT is generated by the dual pixel 101, the IPE 270 may store stereo image data SIDAT in the memory 400.

Figure 6A:
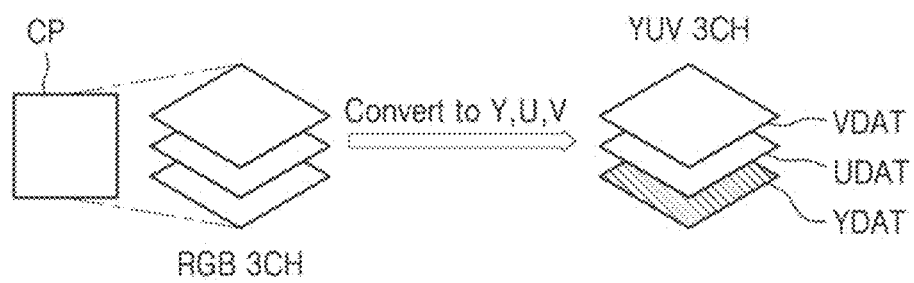
FIG. 6A is a diagram for describing conversion of output data having a Bayer pattern to a YUV format.

FIG. 6A is a diagram for describing conversion of output data having a Bayer pattern to a YUV format, and FIGS. 6B through 6E are diagrams illustrating structures of image data conforming to the YUV format.

Referring to FIG. 6A, a color pixel CP may include red (R), green (G), and blue (B) channels RGB 3CH. In an example embodiment, the color pixel CP may sense an object through a Bayer pattern color filter. The ISP 200 may convert the R, G, and B channels RGB 3CH to Y, U, and V channels YUV 3CH through color space conversion. In this case, the luminance data YDAT is data corresponding to a channel representing a luminance signal. The chrominance data U UDAT is a channel representing a difference between a luminance signal and a blue component, and is also referred to as a blue-difference chroma (Cb) channel. The chrominance data V VDAT is a channel representing a difference between a luminance signal and a red component, and is also referred to as a red-difference chroma (Cr) channel. The electronic device 10 may input the luminance data YDAT that is data for the Y channel among the Y, U, and V channels YUV 3CH to an artificial neural network.

FIGS. 6B through 6E are diagrams illustrating structures of image data IDAT conforming to a YUV format. In order to display a color image, image data in a YUV format may be stored by separating a luminance (luma) component from chrominance (chroma) components for each pixel. The YUV format is also referred to as a YCbCr format. For convenience of description, FIGS. 6B through 6E illustrate a data structure in a YCbCr format.

Figure 6B:
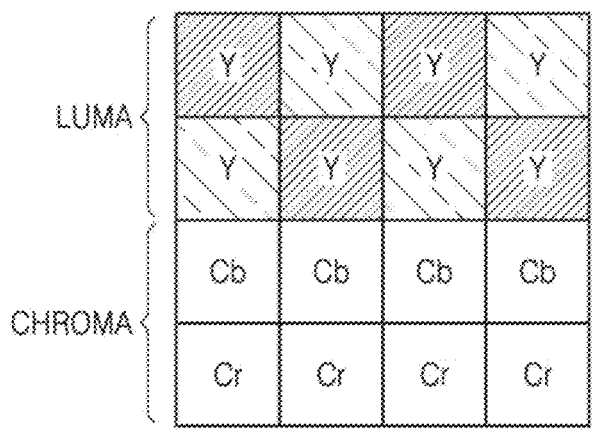
FIGS. 6B through 6E are diagrams illustrating structures of image data conforming to the YUV format.

FIG. 6B illustrates a data structure in which a sampling ratio of YCbCr is 4:4:4. YCbCr 4:4:4 may indicate that a ratio of either of the blue- and red-difference chroma components Cb and Cr to the luma component Y is 4:4:4. When the data structure is read from the luma component Y in the vertical direction and 4 data spaces are provided in each row for the luma component Y, the chroma components have 4 data spaces for each of the blue- and red-difference chroma components Cb and Cr.

Figure 6C:
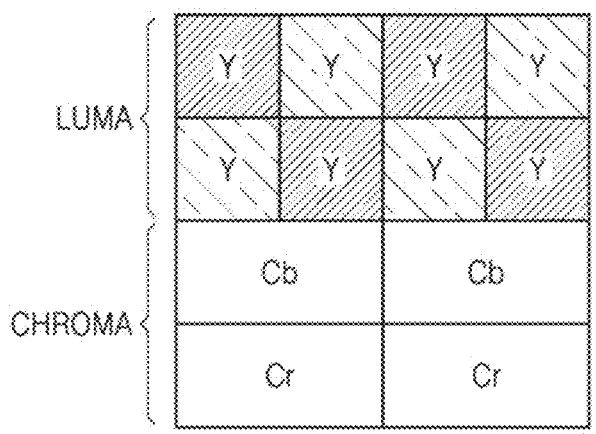

FIG. 6C illustrates a data structure in which a sampling ratio of YCbCr is 4:2:2. When the data structure is read from the luma component Y in the vertical direction, in the case where each row retains 4 data spaces for the luma component Y, 2 data spaces are provided for each of the blue- and red-difference chroma components Cb and Cr. For example, YCbCr 4:2:2 may indicate that a ratio of either of the blue- and red-difference chroma components Cb and Cr to the luma component Y is 4:2:2.

Figure 6D:
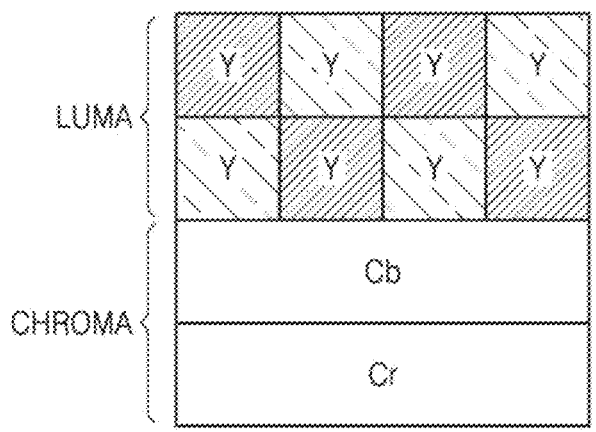

FIG. 6D illustrates a data structure in which a sampling ratio of YCbCr is 4:1:1. When the data structure is read from the luma component Y in the vertical direction, in the case where each row retains 4 data spaces for the luma component Y, 1 data space is provided for each of the blue- and red-difference chroma components Cb and Cr. For example, YCbCr 4:1:1 may indicate that a ratio of either of the blue- and red-difference chroma components Cb and Cr to the luma component Y is 4:1:1.

Figure 6E:
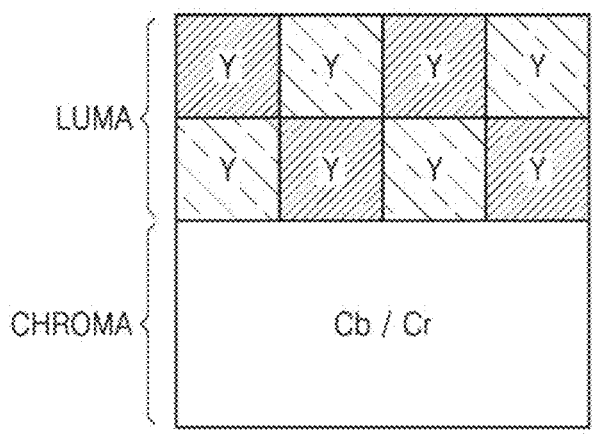

FIG. 6E illustrates a data structure in which a sampling ratio of YCbCr is 4:2:0. When the data structure is read from the luma component Y in the vertical direction, in the case where each row retains 4 data spaces for the luma component Y, only 1 data space is provided for the blue-difference chroma component Cb (or the red-difference chroma component Cr). For example, YCbCr 4:2:0 may indicate that a ratio of the red-difference chroma component Cr (or the blue-difference chroma component Cb) to the luma component Y or the blue-difference chroma component Cb (or the red-difference chroma component Cr) to the luma component Y is 4:2:0.

According to an example embodiment, the image signal processor (200 of FIG. 5) may generate YUV data according to a YCbCr 4:2:0 format with respect to the image data IDAT. YCbCr 4:2:0 may be effective for data processing, storage, and/or display in a portable electronic device. However, the image data IDAT is not limited thereto, and may have various YCbCr data structures as described above.

Figure 7:
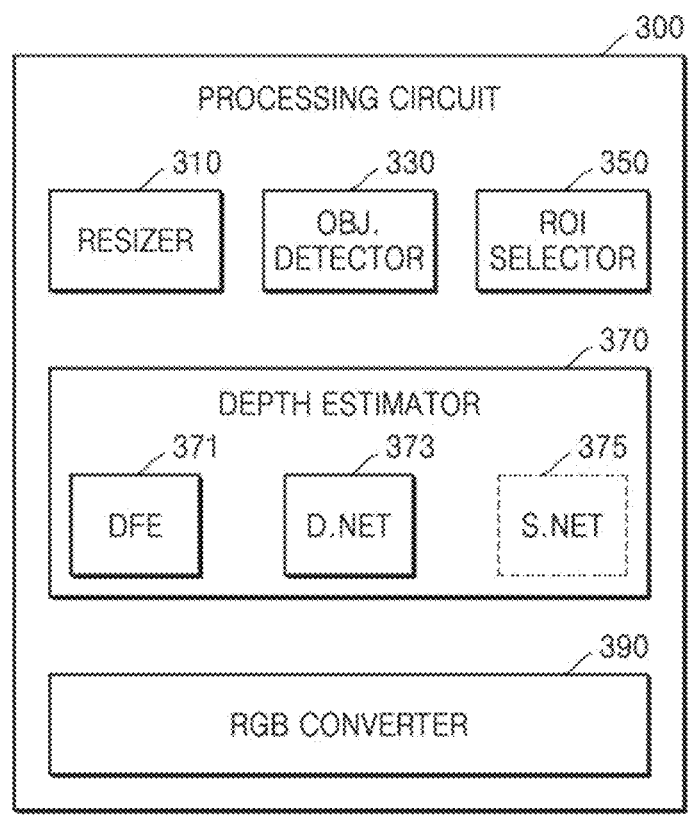
FIG. 7 is a block diagram of a processing circuit according to an example embodiment.

FIG. 7 is a block diagram of the processing circuit 300 according to an example embodiment. A configuration and operations of the processing circuit 300 are now described with reference to FIGS. 1 and 7, and descriptions that are already provided with respect to FIG. 1 will be omitted below.

Referring to FIG. 7, the processing circuit 300 may include a resizer 310, an object detector 330, an ROI selector 350, a depth estimator 370, and an RGB converter 390, and a depth estimator 370 may include a disparity feature extractor (DFE) 371 and a disparity network (D.NET) module 373, or may selectively further include a scene network (S.NET) module 375.

The resizer 310 may adjust a size or resolution of image data IDAT. In an example embodiment, the resizer 310 may reduce the size of the image data IDAT. In an example embodiment, the resizer 310 may reduce the resolution of the image data IDAT. As a result of the resizer 310 adjusting the size or resolution of the image data IDAT, the amount of data processing required for object detection may be reduced. Thus, a data processing speed may be improved, and power required for data processing may be saved.

The object detector 330 may sense a scene including a target object as a whole, and detect each of at least one object included in the scene. The object detector 330 may utilize object detection methods in the field of computer vision. For example, the object detector 330 may identify objects in a scene by using bounding boxes, and detect an object by using handcrafted feature-based object detection, by which objects are individually classified using labeled ground truth information for each object, or an AI-based object detection method exploiting an artificial neural network designed for object detection. The object detector 330 may detect an OOI in at least one object.

The ROI selector 350 may determine an ROI including the OOI. According to an example embodiment, the ROI selector 350 may identify a region corresponding to the OOI detected in the scene and select an ROI including the OOI. For example, an ROI may be larger than a bounding box in which an OOI is detected.

The depth estimator 370 may include the DFE 371, the S.NET module 375, and the D.NET module 373.

A pair of pieces of image data may be input to the DFE 371, and as a result, one piece of output data including a feature may be generated. In an example embodiment, the DFE 371 may extract, via an artificial neural network, features from an input image, such as borders, lines, colors, edges (boundaries of an object), density (including dense and sparse), depth, etc. In an example embodiment, a dense image will be referred to as a textured image, and a sparse image will be referred to as an untextured image. A textured image and an untextured image may correspond to a high-frequency and a low-frequency, respectively.

The DFE 371 may pre-learn a density of an image by using an artificial neural network. For example, the DFE 371 may pre-learn a dense image (i.e., a textured image) by using the artificial neural network, and performance such as edge detection for input data may be improved according to a result of the learning.

According to an example embodiment, the DFE 371 may estimate an absolute depth for an input data pair having a disparity. For example, the DFE 371 may generate absolute depth data as a result of extracting features from the input data pair.

According to an example embodiment, an absolute depth for luminance data YDAT may be estimated by inputting the luminance data YDAT to the DFE 371.

One piece of data may be input to the D.NET module 373, and as a result, one piece of output data including a feature may be generated. The D.NET module 373 may fuse relative depth data and absolute depth data by using an artificial neural network. A D.NET that is an artificial neural network for generating final depth data by fusing relative depth data and absolute depth data may consist of an activation layer including at least one rectified linear unit (ReLU) function and a plurality of convolution layers. For example, the D.NET may be composed of five stages, each stage having one convolution layer and one activation layer.

According to an example embodiment, the D.NET module 373 may fuse relative depth data and absolute depth data by using the D.NET. For example, the D.NET module 373 may receive the absolute depth data output from the DFE 371 and relative depth data output from the S.NET module 375, and generate final depth data as a result of processing by the D.NET. The final depth data may be converted into depth information through processing by a post-processing layer.

One piece of data may be input to the S.NET module 375, and as a result, one piece of output data including a feature may be generated. The S.NET module 375 may process an input image using an artificial neural network configured to learn all features of a scene. The S.NET, which is an artificial neural network that learns all features of the scene, may be implemented with a pyramid structure. According to an example embodiment, the S.NET module 375 may perform encoding on a scene corresponding to image data while gradually decreasing a resolution of the scene, and perform decoding on the scene while gradually increasing the resolution back to an original resolution. For example, the S.NET may have 5 to 6 encoding and decoding stages. As a result of performing the encoding while gradually decreasing the resolution, the S.NET may learn features for all resolutions at which the scene is represented. For example, an artificial neural network model used by the S.NET module 375 may be PyDNet, but embodiments are not limited to a particular model or implementation example.

According to an example embodiment, the S.NET module 375 may estimate a relative depth of the input image by using the S.NET. For example, the S.NET module 375 may receive the absolute depth data output from the DFE 371, and generate relative depth data as a result of the processing of the absolute depth data via the S.NET. The S.NET module 375 may obtain a relatively accurate depth even for image data having a relatively small disparity by estimating a relative depth for a sparse image (i.e., an untextured image).

In an example embodiment, the DFE 371, the S.NET module 375, and the D.NET module 373 may be implemented by a combination of hardware, firmware, and/or software. For example, each of the DFE 371, the S.NET module 375, and the D.NET module 373 may be implemented as a processing circuit such as hardware including a logic circuit, or as a combination of hardware and software, such as a processor that runs software for performing processing operations of an artificial neural network.

According to an example embodiment, the luminance data YDAT may be more robust to a low-light environment than image data in an RGB format even after the luminance data YDAT has been subjected to processing via an artificial neural network. According to an example embodiment, when the processing circuit 300 uses the luminance data YDAT as an input, a depth estimation result that is a result of processing via at least one artificial neural network used by the processing circuit 300 may be more accurate than when using image data in RGB format.

Each of the object detector 330, the ROI selector 350, and the depth estimator 370 may be implemented as a processing circuit such as hardware including a logic circuit, or as a combination of hardware and software, such as a processor that executes software for performing object detection, ROI selection, depth estimation, etc. In particular, each of the object detector 330, the ROI selector 350, and the depth estimator 370 may be implemented as a CPU, an ALU that performs arithmetic and logic operations, a bit shift, etc., a DSP, a microprocessor, a neural processing unit (NPU) for driving an artificial neural network, an ASIC, etc., but is not limited thereto.

The RGB converter 390 may convert the image data IDAT conforming to a YUV format to an RGB format. Unlike the YUV format required to display image data on a display device, the RGB format may be required to visually present image data to the user. In an example embodiment, the RGB converter 390 may convert image data IDAT into visual information accessible by the user, and the visual information may further include depth information therein to provide more diverse information about the object.

Figure 8:
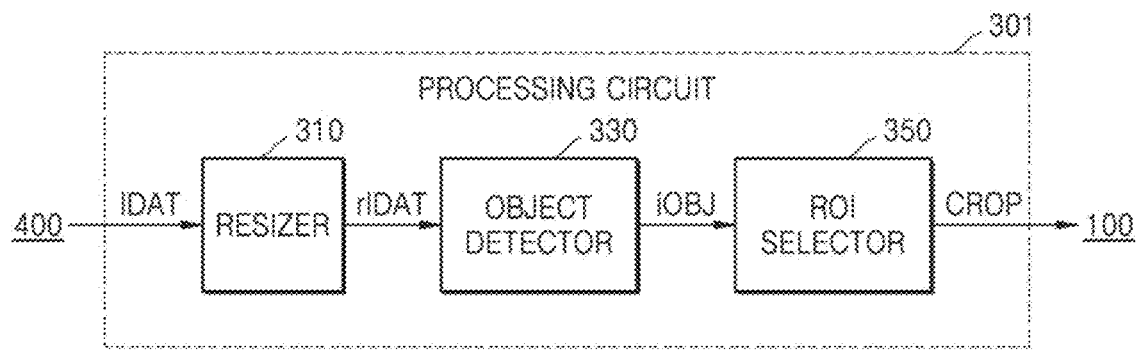
FIG. 8 is a block diagram of a processing circuit according to an example embodiment.

FIG. 8 is a block diagram of a processing circuit 301 according to an example embodiment.

Referring to FIG. 8, the processing circuit 301 may generate a crop signal CROP based on image data IDAT stored in the memory 400 and provide the crop signal CROP to the image sensor 100. In detail, the resizer 310 may generate resizing image data rIDAT as a result of reducing a size or resolution of the image data IDAT.

The object detector 330 may detect at least one object in the resizing image data rIDAT, detect an OOI as a result of detecting an object using, for example, handcrafted feature-based object detection or AI-based object detection, and generate object information iOBJ for the OOI.

The ROI selector 350 may determine an ROI including the OOI based on the object information iOBJ. According to an example embodiment, the ROI selector 350 may select an ROI including an OOI detected in a scene, and generate a crop signal CROP corresponding to the ROI.

According to an example embodiment, despite its relatively small baseline distance, the electronic device 10 including the dual pixel 101 may be able to capture an image of an object having a relatively small size based on the crop signal CROP while maintaining a high resolution. Accordingly, the electronic device 10 is able to satisfy high resolution requirements related to depth estimation for image data having a small disparity.

Figure 9A:
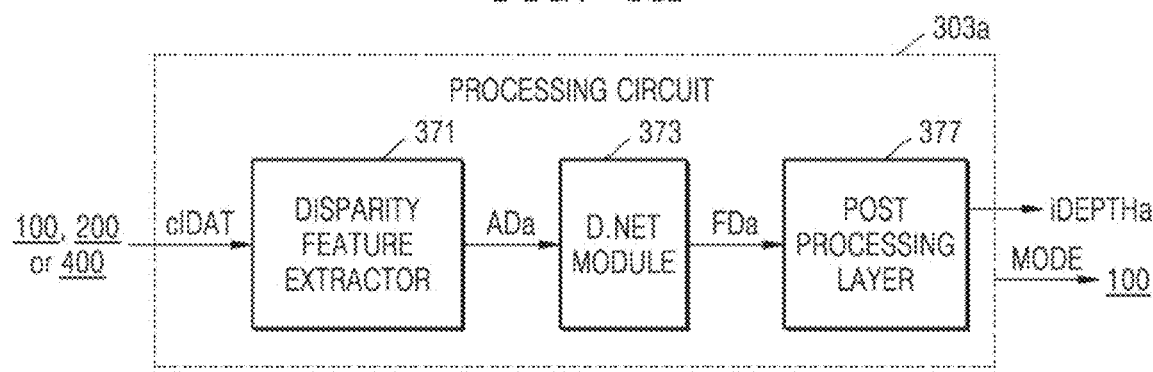
FIGS. 9A and 9B are block diagrams of processing circuits according to example embodiments.
Figure 9B:
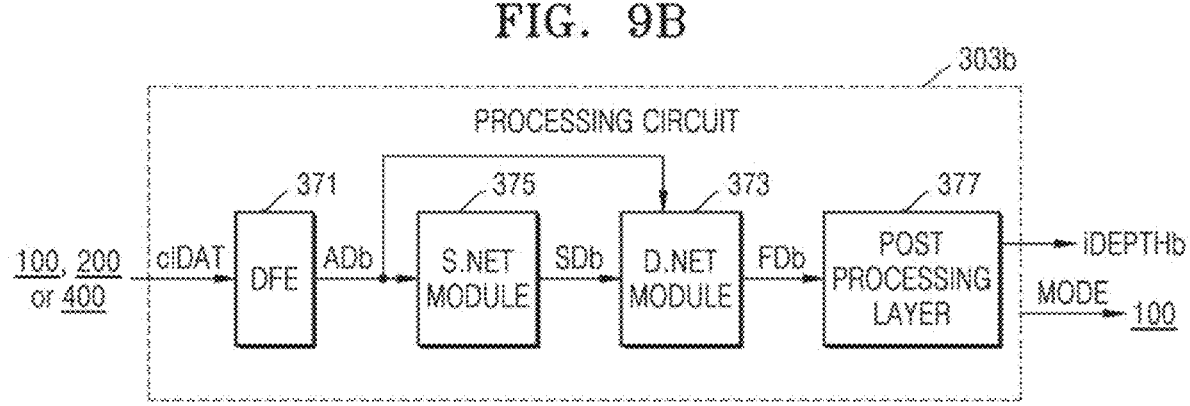

FIGS. 9A and 9B are block diagrams of processing circuits 303a and 303b according to example embodiments.

Referring to FIG. 9A, the processing circuit 303a may generate depth information iDEPTHa by processing crop image data cIDAT, and produce a mode signal MODE for changing an operating mode of the electronic device 10 according to a result of the processing. According to an example embodiment, the crop image data cIDAT may be directly generated by the image sensor (100 of FIG. 1) in response to the crop signal (CROP of FIG. 2), provided directly from the image signal processor (200 of FIG. 1) that processes and corrects the output data (ODAT of FIG. 2), or loaded from the memory 400. The processing circuit 303a may include a DFE 371, a D.NET module 373, and a post-processing layer 377.

Absolute depth data ADa may be generated by inputting crop image data cIDAT to the DFE 371. A D.NET supported by the D.NET module 373 may consist of an activation layer including at least one ReLU function and a plurality of convolution layers, and generate final depth data FDa by processing the absolute depth data. The post-processing layer 377 may process the final depth data FDa into depth information iDEPTHa.

According to an example embodiment, the processing circuit 303a may generate depth information that is more robust to a low-light environment by using only luminance data YDATa among the crop image data cIDAT than when using image data in the RGB format.

In addition, according to an example embodiment, the processing circuit 303a may allow an artificial neural network to learn only the luminance data YDATa among YUV data, for example, luminance data (YDAT of FIG. 6A, and chrominance data (UDAT and VDAT of FIG. 6A)), thereby reducing memory usage and power consumption.

Referring to FIG. 9B, the processing circuit 303b may generate depth information iDEPTHb by processing crop image data cIDAT. According to an example embodiment, the processing circuit 303b may include a DFE 371, a S.NET module 375, a D.NET module 373, and a post-processing layer 377.

Absolute depth data ADb may be generated as a result of estimating an absolute depth for the crop image data cIDAT by inputting the crop image data cIDAT to the DFE 371. The S.NET module 375 may estimate a relative depth for the absolute depth data ADb by using a S.NET. A result of estimating the relative depth for the absolute depth data ADb may be output as relative depth data SDb. A D.NET supported by the D.NET module 373 may generate final depth data FDb by fusing the absolute depth data ADb and the relative depth data SDb. The post-processing layer 377 may process the final depth data FDb into depth information iDEPTHb.

According to an example embodiment, the processing circuit 303b may improve the accuracy of depth estimation by additionally using a S.NET. In addition, according to an example embodiment, the processing circuit 303b may process crop image data cIDAT corresponding to an ROI rather than the entire scene even for data having a small disparity, for example, the stereo image data (SIDAT of FIG. 1) generated by the dual pixel (101 of FIG. 1). Thus, according to an example embodiment, the electronic device 10 may reduce the amount of data processing required for depth estimation, thereby reducing power consumption and improving data processing speed.

According to an example embodiment, the processing circuit 303a or 303b may process a part of the artificial neural network via another processing circuit, thereby enabling distributed data processing and achieving distributed/parallel processing for tasks that require processing of large sized data or a long data processing time.

Figure 10A:
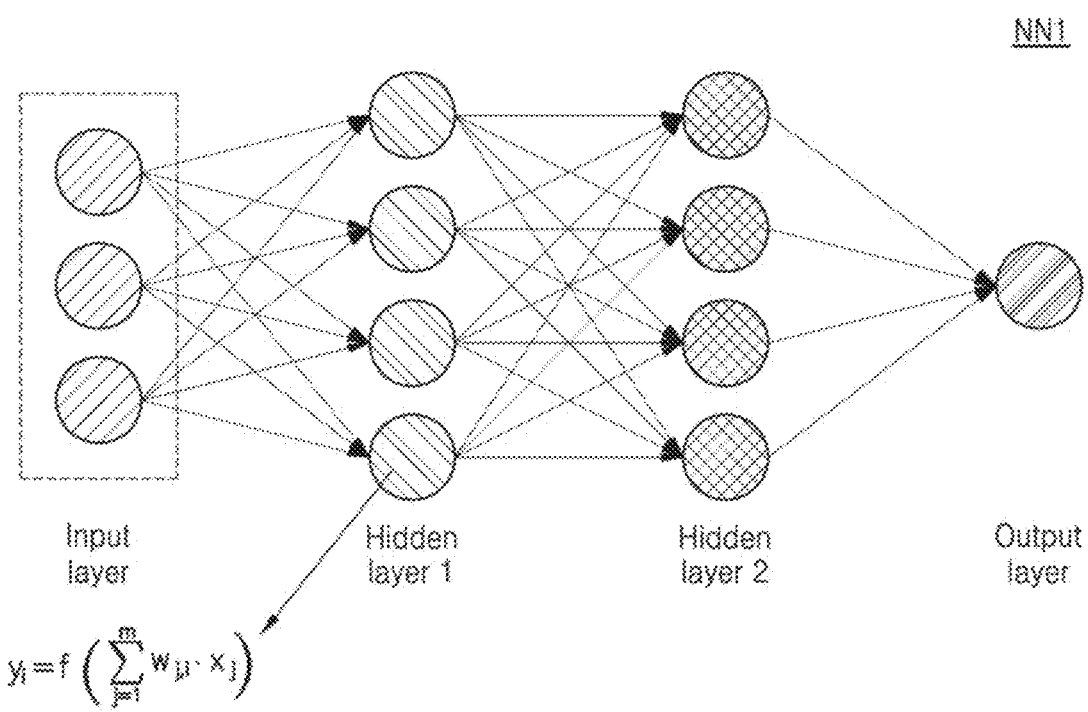
Figure 10B:
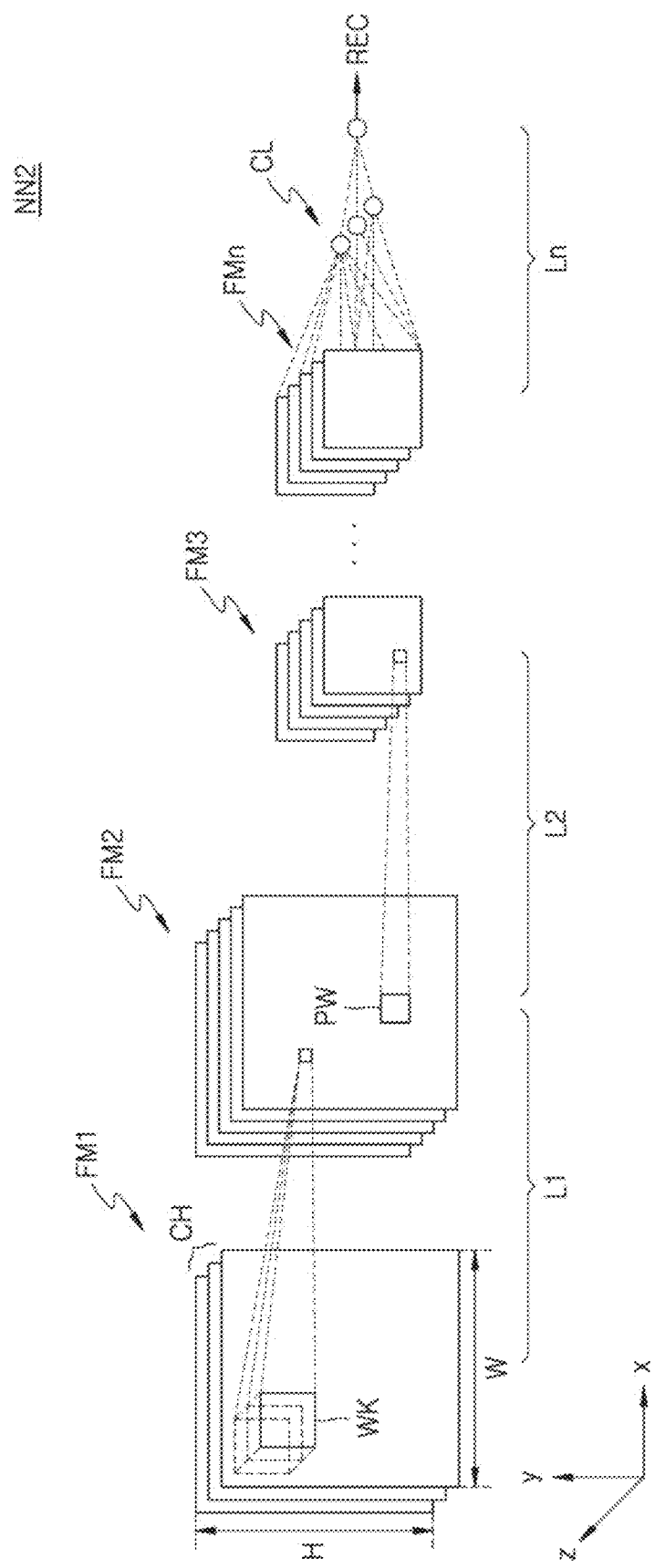

FIGS. 10A through 10C are diagrams for describing structures and operations of artificial neural networks NN1, NN2, and NN3.

Referring to FIG. 10A, the artificial neural network NN1 may be a convolution neural network (CNN), but is not limited thereto. Although FIG. 10A shows that the artificial neural network NN1 includes two hidden layers for convenience of description, the artificial neural network NN1 is not limited thereto, and may include different numbers of hidden layers. Furthermore, although FIG. 10A shows that the artificial neural network NN1 includes a separate input layer for receiving input data, the input data may be directly input to a hidden layer according to an embodiment.

In the artificial neural network NN1, nodes in layers excluding an output layer may be connected to nodes in a next layer via links for transmitting output signals. Values obtained by multiplying values for nodes included in a previous layer by associated weights respectively assigned to the links may be input to each node via the links. The node values from the previous layer may correspond to axon values, and a weight may correspond to a synaptic weight. A weight may be referred to as a parameter of the artificial neural network NN1.

An activation function may be applied to convert values in feature maps into non-linear information about the presence or absence of features. For example, the activation function may include a sigmoid function, a tan h (hyperbolic tangent) function, a rectified linear unit (ReLU) function, or the like, and introduce non-linearity into the artificial neural network NN1.

An output at any one node included in the artificial neural network NN1 may be defined by Equation 1 below.

$$y_i = f\left(\sum_{j=1}^{m} w_{j,i} x_j\right) \quad \text{[Equation 1]}$$

Equation 1 may define an output value yi at an i-th node for m input values from any arbitrary layer. xj may represent an output value at a j-th node in the previous layer, and wj,i may represent a weight applied to a connection between the j-th node in the previous layer and the i-th node in the current layer. f( ) may represent an activation function. As shown in Equation 1, a result of accumulating products of input value xj and weight wj,i may be used for the activation function. For example, a multiply-accumulate (MAC) operation that is an operation of multiplying the input value xj by the weight wj,i and summing up the multiplication results may be performed at each node. In addition to computing the accumulation result for the activation function, MAC operations may be required in various application fields, and for this purpose, a processing device capable of processing MAC operations in an analog circuit domain may be used.

Referring to FIG. 10B, the artificial neural network NN2 may include a plurality of layers, i.e., first through n-th layers L1 through Ln. Each of the first through n-th layers L1 through Ln may be a linearity or non-linearity layer, and in an example embodiment, at least one linearity layer combined with at least one non-linearity layer may also be referred to as one layer. For example, the linearity layer may include a convolution layer and a fully connected layer, and the non-linearity layer may include a pooling layer and an activation layer.

For example, the first layer L1 may be a convolution layer, the second layer L2 may be a pooling layer, and the n-th layer Ln may be a fully connected layer as an output layer. A neural network NN may further include an activation layer or a layer that performs a different type of operation.

Each of the first through n-th layers L1 through Ln may receive input data, for example, an image frame, or a feature map generated in a previous layer as an input feature map, and perform an operation on the input feature map to generate an output feature map or a recognition signal REC. In this case, a feature map refers to data representing various features of input data. First through n-th feature maps FM1 through FMn may each have, for example, a two-dimensional (2D) matrix or a three-dimensional (3D) matrix (or tensor) form. The first through n-th feature maps FM1 through FMn may each have a width W (or column), a height H (or row), and a depth D, which respectively correspond to an x-axis, a y-axis and a z-axis in a coordinate system. In this case, the depth D may be referred to as the number of channels.

The first layer L1 may generate a second feature map FM2 by convolving a first feature map FM1 with a weight map WK. The weight map WK may filter the first feature map FM1 and may also be referred to as a filter or a kernel. A depth of the weight map WK, i.e., the number of channels, may be equal to a depth of the first feature map FM1, i.e., the number of channels therein, and channels in the weight map WK may be respectively convolved with corresponding channels in the first feature map FM1. The weight map WK may be shifted by sliding across the first feature map FM1 as a sliding window. The amount by which the weight map WM is shifted may be referred to as a stride length or stride. During each shift, weights included in the weight map WK may be respectively multiplied by and added to all pieces of cell data in a region of the first feature map FM1 that it overlaps. The pieces of data in the region of the first feature map FM1 overlapped by the weights included in the weight map WK may be referred to as extracted data. As the first feature map FM1 is convolved with the weight map WK, one channel of the second feature map FM2 may be generated. Although FIG. 10B illustrates one weight map Wk, a plurality of weight maps WM may be actually convolved with the first feature map FM1 to generate a plurality of channels of the second feature map FM2. For example, the number of channels of the second feature map FM2 may correspond to the number of weight maps WM.

The second layer L2 may generate the third feature map FM3 by changing a spatial size of the second feature map FM2 through pooling. Pooling may be referred to as sampling or down-sampling. A 2D pooling window PW may be shifted over the second feature map FM2 by a size of the pooling window PW, and a maximum value among pieces of feature data (or an average value of the pieces of cell data) in a region of the second feature map FM2 overlapped by the pooling window PW may be selected. Accordingly, the third feature map FM3 having a changed spatial size may be generated based on the second feature map FM2. The number of channels of the third feature map FM3 is equal to the number of channels of the second feature map FM2.

The n-th layer Ln may combine features in the n-th feature map FMn to classify the input data as a class CL. Furthermore, the n-th layer Ln may generate a recognition signal REC corresponding to the class CL. In an embodiment, the input data may correspond to frame data included in a video stream, and by extracting a class CL corresponding to an object included in an image represented by the frame data based on the n-th feature map FMn provided from a previous layer, the n-th layer Ln may recognize the object and generate a recognition signal REC corresponding to the recognized object.

Referring to FIG. 10C, input feature maps 201 may include D channels, and an input feature map for each channel may have a size of H rows and W columns (D, H, and W are natural numbers). Each kernel has a size of R rows and S columns, and kernels may include a number of channels corresponding to the number D of channels (or depth) of the input feature maps (R and S are natural numbers). Output feature maps may be generated via a 3D convolution operation between the input feature maps and the kernels, and may include Y channels according to the 3D convolution operation.

FIGS. 11A through 11D are block diagrams illustrating a structure of a network according to example embodiments. Repeated descriptions with respect to FIGS. 11A through 11D will be omitted.

Figure 11A:
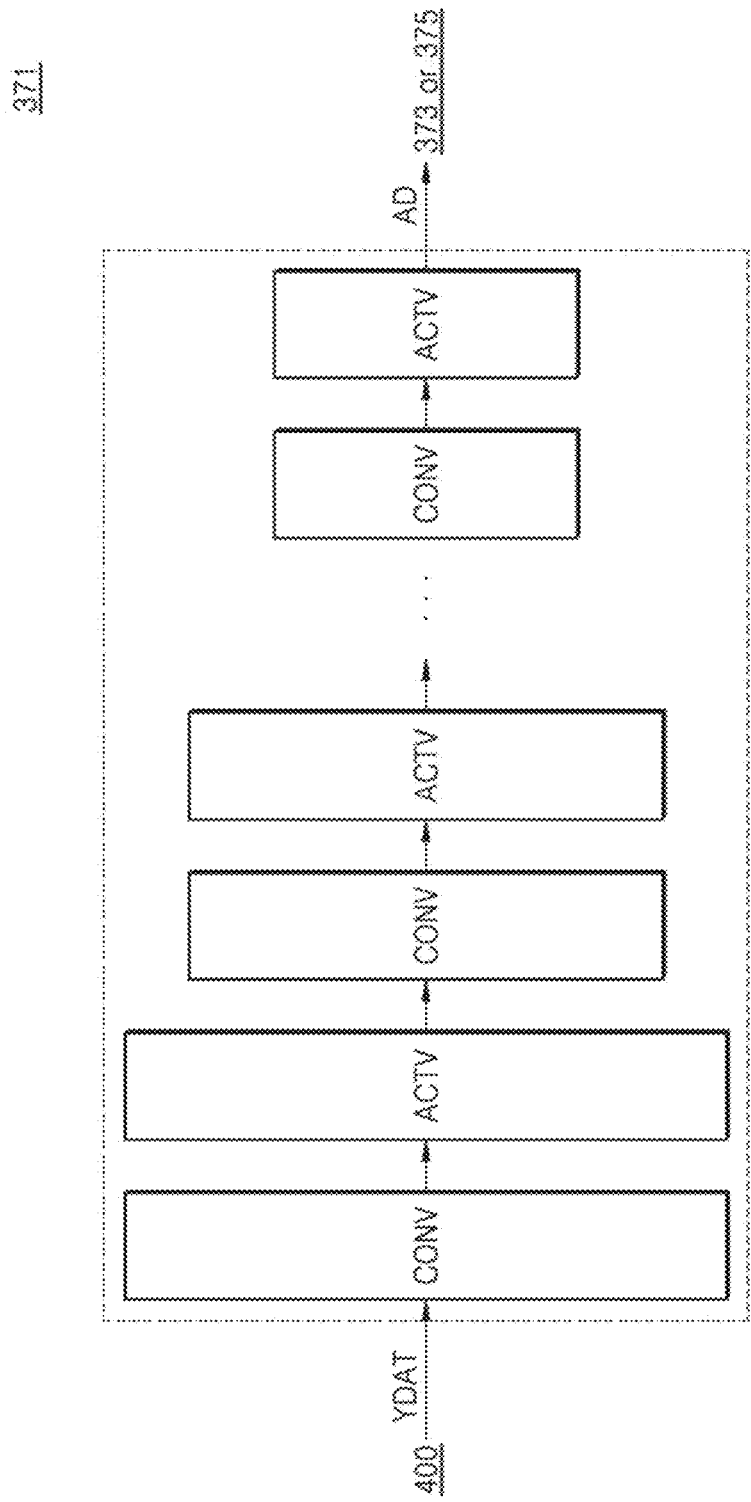
FIGS. 11A, 11B, 11C, and 11D are block diagrams illustrating a structure of a network, according to example embodiments.

FIG. 11A is a block diagram illustrating a structure of the DFE 371 according to an example embodiment. Referring to FIG. 11A, the DFE 371 may include a plurality of stages, and each stage may consist of a pair of convolution layer CONV and an activation layer ACTV. The activation layer ACTV is a non-linearity layer to which a sigmoid function, a hyperbolic tangent (tan h) function, or a ReLU function is applied to convert the presence or absence of a feature into non-linear information.

According to an example embodiment, the DFE 371 may receive luminance data YDAT from the memory 400 and input the luminance data YDAT to a convolution layer CONV of a first stage to process data. The DFE 371 may generate absolute depth data AD as a result. The absolute depth data AD may be provided to the S.NET module 375 or the D.NET module 373.

Figure 11B:
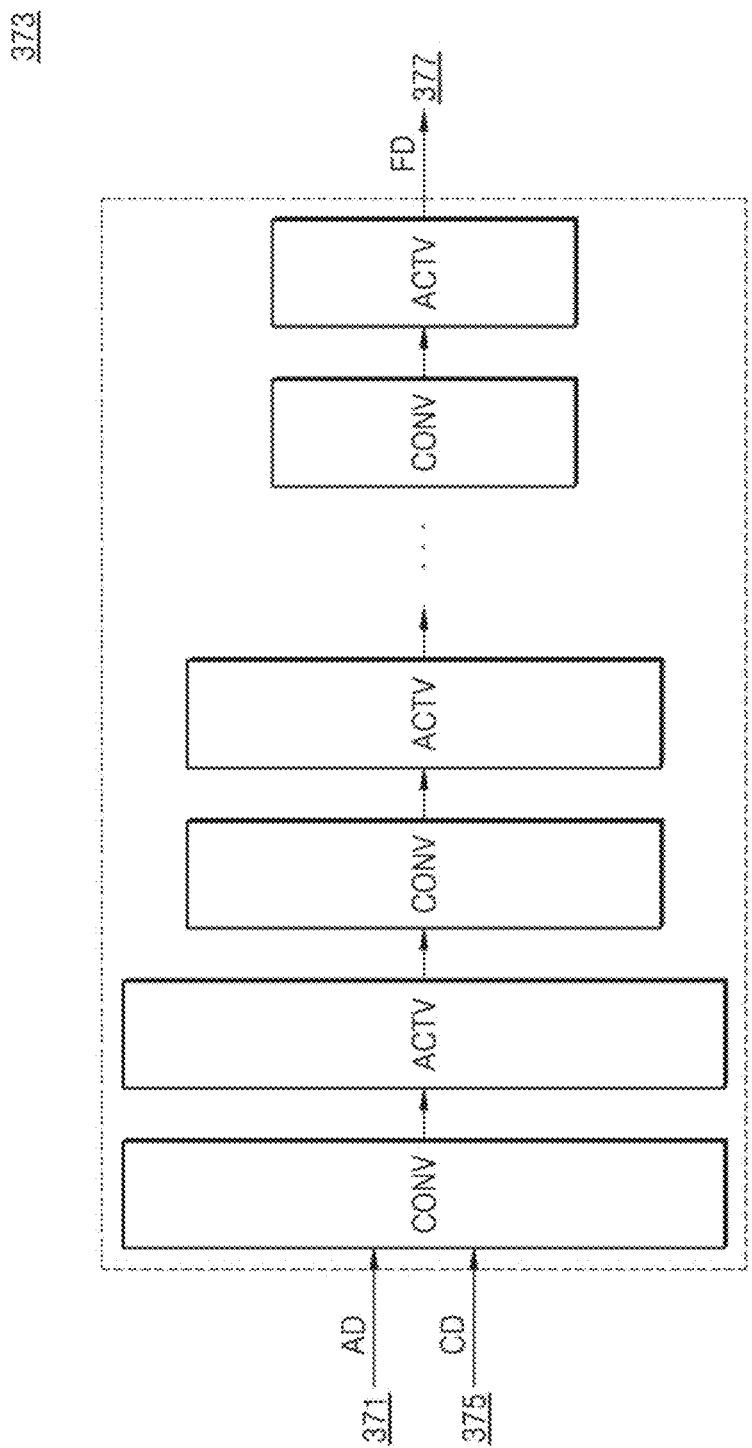

FIG. 11B is a block diagram of a structure of the D.NET module 373 according to an example embodiment. Referring to FIG. 111B, the D.NET module 373 may include a plurality of stages, and each stage may include a pair of a convolution layer CONV and an activation layer ACTV.

According to an example embodiment, the D.NET module 373 may receive absolute depth data AD from the DFE 371 and/or relative depth data CD from the S.NET module 375.

The absolute depth data AD or the relative depth data CD combined with the absolute depth data AD may be fed to a convolution layer CONV of a first stage. The D.NET module 373 may generate final depth data FD as a result. The final depth data FD may be transmitted to the post-processing layer 377.

Figure 11C:
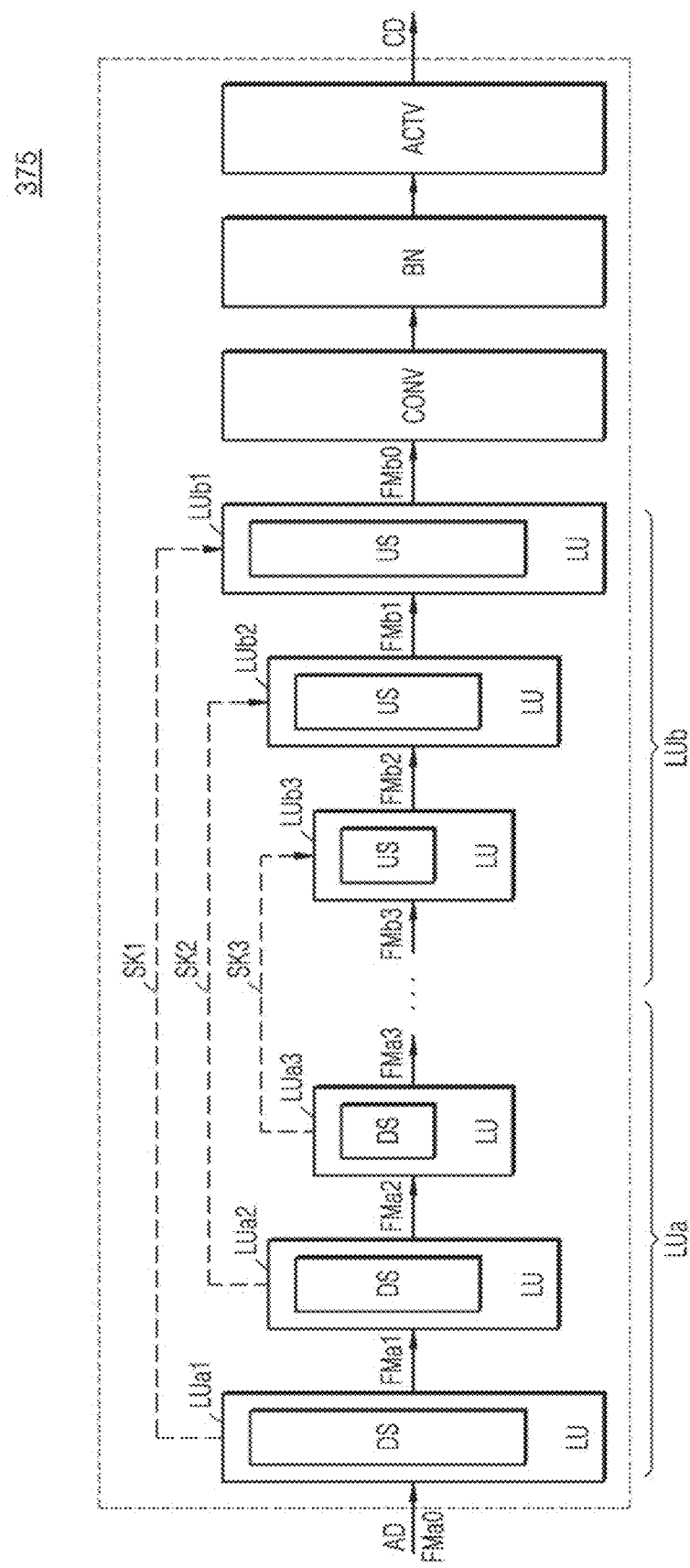

FIG. 11C is a block diagram of a structure of the S.NET module 375 according to an example embodiment. Referring to FIG. 11C, a S.NET used in the S.NET module 375 may include an input layer IL, an output layer OL, a encoding layer unit LUa, and a decoding layer unit LUb. The S.NET may receive absolute depth data AD and calculate feature values for the absolute depth data AD by passing it through the input layer IL, the encoding layer unit LUa, the decoding layer unit LUb, and the output layer OL.

The S.NET may include a plurality of encoders (encoding layers) and a plurality of decoders (decoding layers) that are symmetrical to each other and implemented in a pyramid structure. For example, the plurality of encoders may be serially connected to gradually lower a resolution of encoded data while the plurality of decoders may be serially connected to gradually increase a resolution of decoded data.

Each encoding layer unit may receive feature maps output from a previous encoding layer unit, and perform operations assigned to each encoding layer, for example, a first encoding layer LUa1, in the encoding layer unit LUa. For example, the first encoding layer LUa1 may receive a feature map FMa0 and may perform operations by various layers included in the first encoding layer LUa1. For example, the first encoding layer LUa1 may include a convolution layer, a sampling layer, and an activation layer. The convolution layer may perform a convolution operation. The sampling layer may perform down-sampling, up-sampling, average pooling, or maximum pooling operations. The activation layer may perform an operation using a ReLU function or a sigmoid function. The first encoding layer LUa1 may output a feature map FMa1 based on results of the operations.

The feature map FMa1 output from the first encoding layer LUa1 may have a smaller width and a smaller height but a greater depth than the input feature map FMa0. For example, the first encoding layer LUa1 may control the width, height, and depth of the feature map FMa1, and control the depth of the feature map FMa1 so as not to become excessively large. The first encoding layer LUa1 may have a parameter for setting the depth of the feature map FMa1. Moreover, the first encoding layer LUa1 may include a down-sampling layer DS. The down-sampling layer DS may select certain feature values from among feature values included in the input feature map FMa0 and output the selected features values as feature values for the feature map FMa1. For example, the down-sampling layer DS may control the width and height of the feature map FMa1. Second and third encoding layers LUa2 and LUa3 may each process operations in a similar manner to the first encoding layer LUa1. For example, a current encoding layer may receive a feature map from a previous encoding layer, process operations via a plurality of layers included in the current encoding layer, and output a feature map including results of the operations to a next encoding layer.

An encoding layer in the encoding layer unit LUa may output a result to a next encoding layer or a decoding layer at the same level in the decoding layer unit LUb. Each encoding layer, for example, the first encoding layer LUa1, may be fixedly connected to a next encoding layer and may be connected to a decoding layer at the same level in the decoding layer unit LUb by a corresponding one of a plurality of skip connections, i.e., first through third skip connections SK1 through SK3. When two layers are at the same level, it may be understood that the two layers are arranged symmetrically at the same distance from the input layer IL and the output layer OL, and layers at the same level may be, for example, the first encoding layer LUa1 and a first decoding layer LUb1.

According to an example embodiment, at least some of the plurality of skip connections SK1 through SK3 may be selected by the processing circuit 300 or the electronic device 10. For example, the processing circuit 300 may receive information about a skip level. When a skip level of an artificial neural network model is set, at least some of the first through fourth skip connections SK1 through SK3 corresponding to the preset skip level may be activated. For example, when the skip level of the artificial neural network model is 2, the first and second skip connections SK1 and SK2 may be activated. The encoding layer unit LUa may output feature maps to the decoding layer unit LUb via the activated skip connections. Deactivated skip connections, for example, the second and third skip connections SK2 and SK3, are not able to propagate feature maps to the decoding layer unit LUb.

According to an example embodiment, layers at the same level, for example, the first encoding layer LUa1 and the first decoding layer LUb1, may process a feature map having substantially the same size. For example, the feature map FMa0 received by the first encoding layer LUa1 may have substantially the same size as a feature map FMb0 output by the first decoding layer LUb1. For example, a size of a feature map may include at least one of a width, a height, and a depth thereof. Furthermore, the feature map FMa1 output from the first encoding layer LUa1 may have substantially the same size as a feature map FMb1 received by the first decoding layer LUb1.

According to an example embodiment, an encoding layer and a decoding layer at the same level may have substantially the same sampling size. For example, a down-sampling size of the first encoding layer LUa1 may be substantially the same as an up-sampling size of the first decoding layer LUb1.

A decoding layer in the decoding layer unit LUb may receive a feature map from a previous decoding layer or an encoding layer at the same level in the encoding layer unit LUa. The decoding layer may process operates by using the received feature map. For example, the decoding layer may include a convolution layer, a sampling layer, and an activation layer.

The feature map FMb0 output from the first decoding layer LUb1 may have a smaller width and a smaller height but a greater depth than the input feature map FMb1. For example, the first decoding layer LUb1 may control the width, height, and depth of the feature map FMb0, and control the depth of the feature map FMb0 so as not to become excessively large. The first decoding layer LUb1 may have a parameter for setting the depth of the feature map FMb0.

An up-sampling layer US may adjust a size of an input feature map. For example, the up-sampling layer US may control a width and a height of the input feature map. The up-sampling layer US may perform an up-sampling operation by using each feature value in the input feature map and feature values close to the corresponding feature value. For example, the up-sampling layer US may be a layer for copying the same feature values into an output feature map by using a nearest neighbor method. As another example, the upsampling layer US may be a transpose convolution layer, and may upsample an image by using a weight map.

Data upsampled to a previous resolution may be converted into relative depth data CD through a convolution layer CONV, a batch normalization layer (BN), and an activation layer ACTV.

Figure 11D:
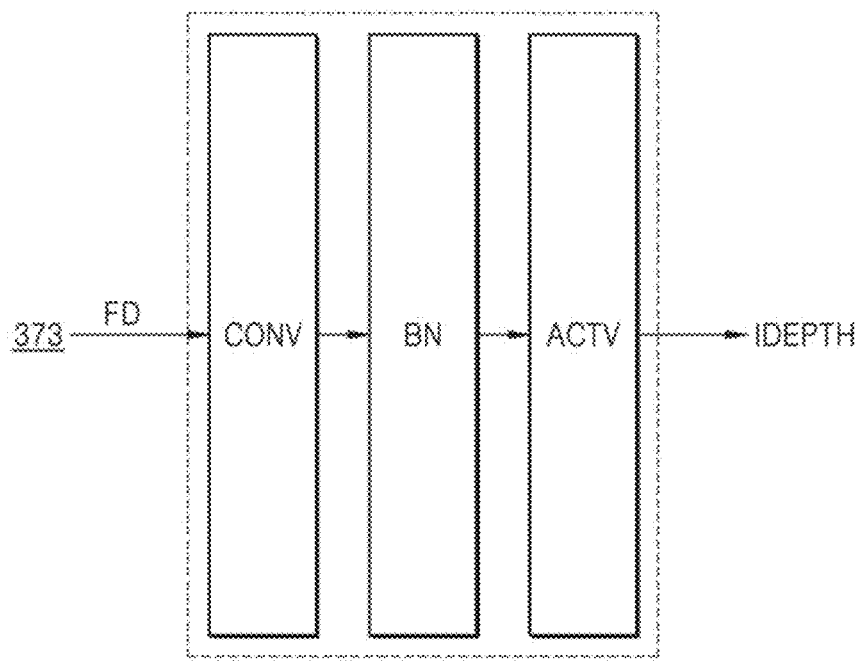

FIG. 11D is a block diagram of a structure of the post-processing layer 377 according to an example embodiment.

According to an example embodiment, the post-processing layer 377 may include a convolutional layer CONV, a batch normalization layer BN, and an activation layer ACTV. The post-processing layer 377 may convert the final depth data FD into depth information iDEPTH.

Figure 12:
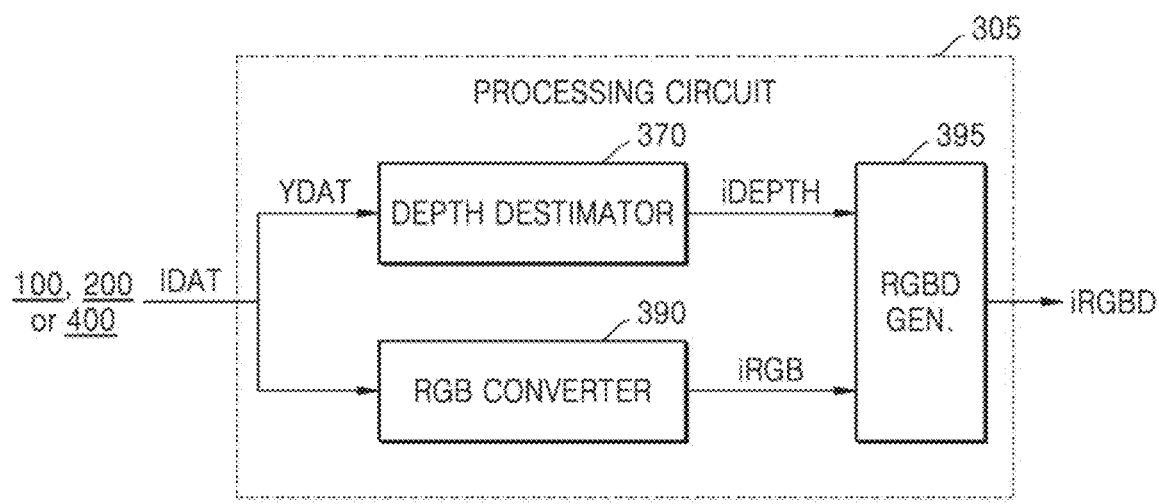
FIG. 12 is a block diagram of a processing circuit according to an example embodiment.

FIG. 12 is a block diagram of a processing circuit 305 according to an example embodiment.

Referring to FIG. 12, the processing circuit 305 may generate color and depth information iRGBD based on image data IDAT generated by the image sensor 100 or the ISP 200 or loaded from the memory 400. The processing circuit 305 may further include a color and depth generator 395.

In an example embodiment, a depth estimator 370 may generate depth information iDEPTH by estimating a depth for the image data IDAT. In an example embodiment, the depth estimator 370 may generate depth information iDEPTH by estimating a depth for luminance data YDAT included in the image data IDAT. Since the depth estimator 370 estimates the depth for the luminance data YDAT, the amount of data processing required for depth estimation and power consumption associated with data processing may be reduced, and a data processing speed may be improved. The depth information iDEPTH may be provided to the color and depth generator 395.

In an example embodiment, an RGB converter 390 may perform RGB conversion on the image data IDAT including data conforming to the YUV format. The RGB converter 390 may generate color information iRGB as a result of the RGB conversion. The color information iRGB may be provided to the color and depth generator 395. The RGB conversion will be described in more detail below with reference to FIG. 13.

The color and depth generator 395 may combine the depth information iDEPTH with the color information iRGB and generate the color and depth information iRGBD.

Figure 13:
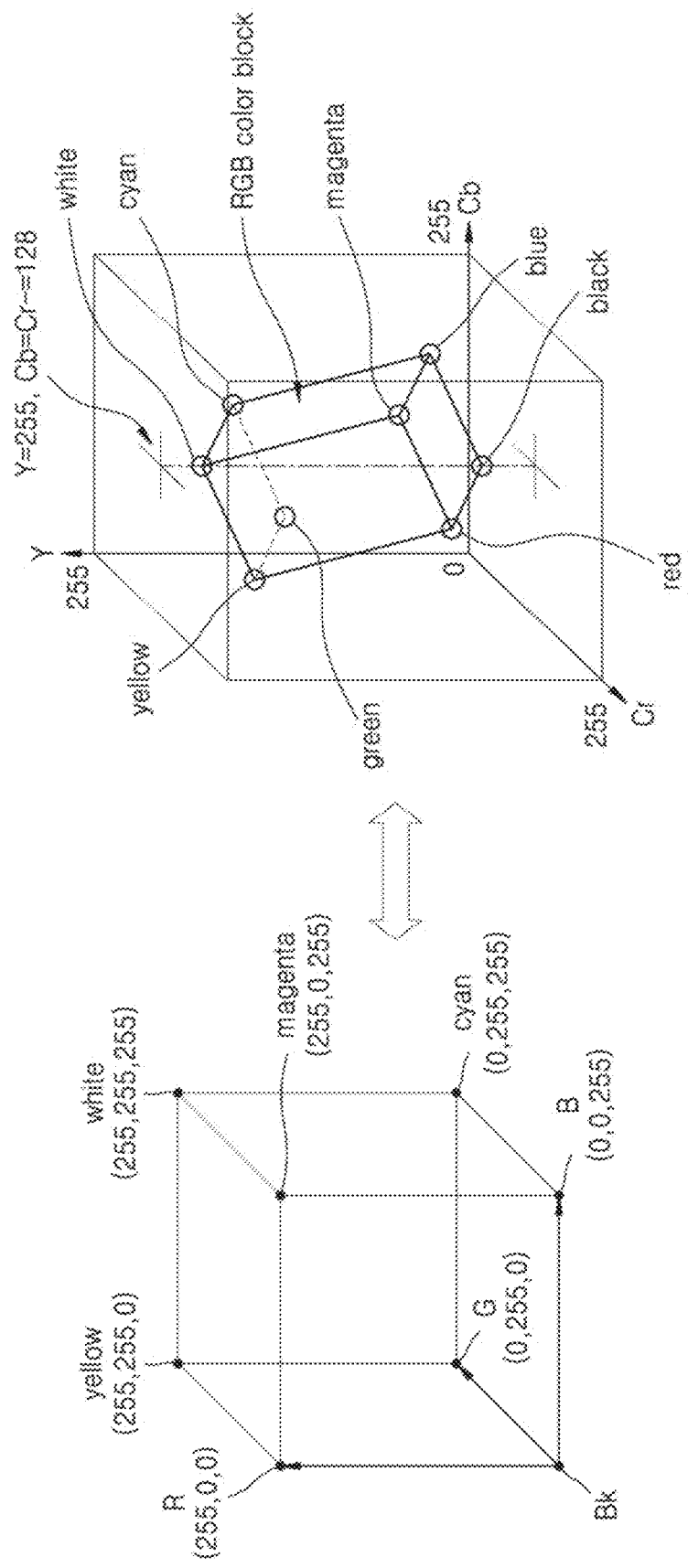
FIG. 13 is a diagram illustrating a relationship of conversion of image data between RGB format and YUV format.

FIG. 13 is a diagram illustrating a relationship of conversion of image data between RGB and YUV formats. A result of an operation performed by the RGB converter (390 of FIG. 7 is now described with reference to FIG. 13 in conjunction with FIG. 7.

The relationship of conversion between an RGB color space and a YUV color space is described with reference to FIG. 13. According to an example embodiment, the RGB converter 390 may perform conversion between the RPG color space and the YUV color space. According to an example embodiment, the RGB converter 390 may convert data in the YUV color space into data in the RGB color space. However, embodiments are not limited thereto, and the RGB converter 390 may convert data in the RGB color space into data in the YUV color space. In an example embodiment, the RGB converter 390 may generate color information iRGB. In an example embodiment, data in the YUV color space is converted into data in the RGB color space as an example, but it will be understood that conversion from the RGB color space to the YUV color space may be easily inferred from an inverse operation of the conversion from the YUV color space to the RGB color space.

In the RGB color space, red (R), blue (B), and green (G) constitute three dimensions, and its origin is black Bk. When data is represented by 8 bits, red, blue, and green may be represented as (255, 0, 0), (0, 0, 255), and (0, 255, 0), respectively. In this case, yellow may be represented as (255, 255, 0), magenta as (255, 0, 255), cyan as (0, 255, 255), and white as (255, 255, 255).

The RGB color space may be converted to the YUV color space by using the following Equation 2, Equation 3, and Equation 4:

$$Y = (0.257 \times R) + (0.504 \times G) + (0.098 \times B) + 16 \quad \text{[Equation 2]}$$

$$U = -(0.148 \times R) - (0.291 - G) + (0.439 \times B) + 128 \quad \text{[Equation 3]}$$

$$V = (0.439 \times R) - (0.368 \times G) - (0.071 \times B) + 128 \quad \text{[Equation 4]}$$

When the RGB color space is converted to the YUV color space by using Equation 2 through Equation 4, a positional relationship among red, blue, green, yellow, magenta, cyan, and white in the RGB color space changes.

In the YUV color space, luminance (Y), blue-difference chrominance (Cb) (i.e., a U channel), and red-difference chrominance (Cr) (i.e., a V channel) constitute dimensions. When data is represented by 8 bits, red, blue, green, yellow, magenta, cyan, white, and black may be represented as corners of an octahedron but may not be limited to particular positions. For example, white is a color having a luminance (Y) of 255, and both blue-difference chrominance (Cb) and red-difference chrominance Cr of 128.

Figure 14A:
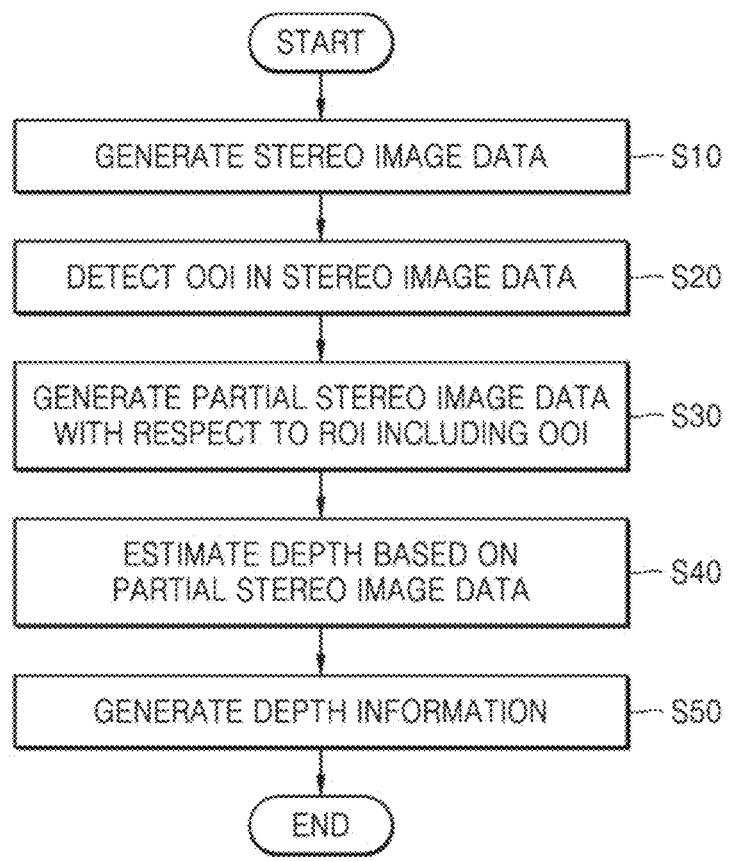
FIGS. 14A and 14B are flowcharts of an operation method of an electronic device, according to an example embodiment.
Figure 14B:
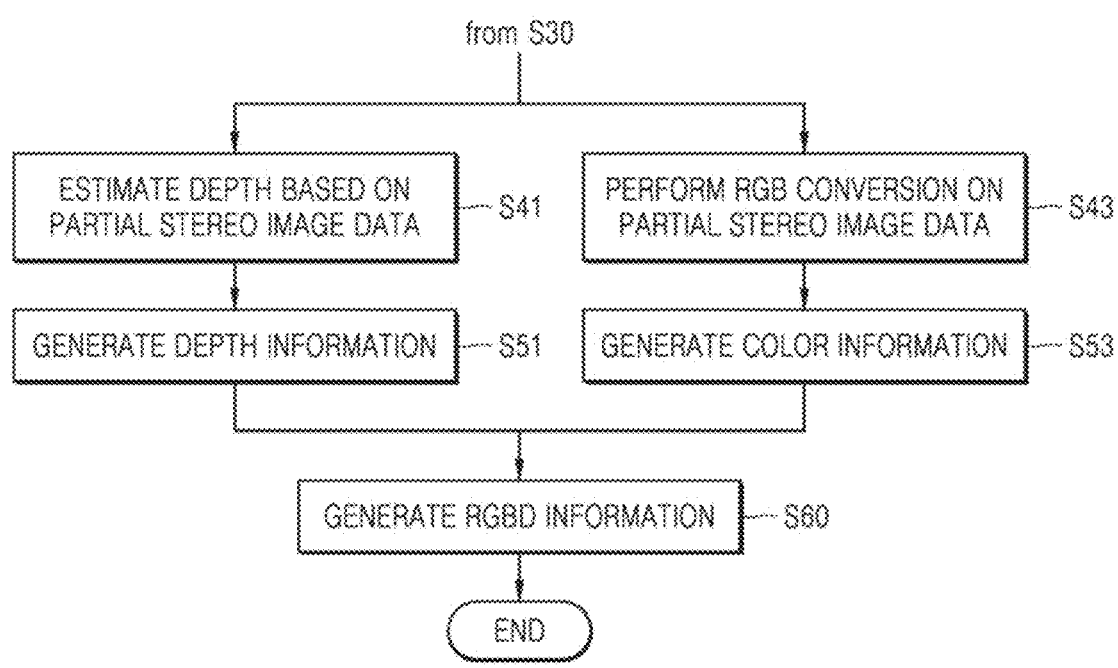

FIGS. 14A and 14B are flowcharts of an operation method of the electronic device 10, according to an example embodiment. The operation method is now described with reference to FIGS. 14A and 14B together with FIG. 1.

Referring to FIG. 14A, in operation S10, stereo image data (SIDAT of FIG. 1) may be generated. In an example embodiment, the electronic device 10 may generate the stereo image data SIDAT by using the dual pixel (101 of FIG. 1). The stereo image data SIDAT may include a pair of pieces of image data $IDAT_L$ and $IDAT_R$.

In operation S20, an OOI may be detected in the stereo image data SIDAT. In an example embodiment, the processing circuit (300 of FIG. 1) may extract a plurality of objects from a scene, and detect an OOI in the objects. The processing circuit 300 may generate a crop signal (CROP of FIG. 2) to sense an ROI including the OOI.

In operation S30, partial stereo image data for the ROI including the OOI may be generated. In an example embodiment, the processing circuit 300 may generate partial stereo image data for sensing a partial image for the scene based on the crop signal CROP. The partial stereo image data may correspond to the crop image data cIDAT of FIG. 9A or 9B.

In operation S40, a depth may be estimated based on the partial stereo image data. In an example embodiment, the image sensor 100 may sense an ROI, which is a relatively small region compared to a scene, and the processing circuit 300 may estimate a depth based on partial stereo image data by using an artificial neural network for depth estimation.

In operation S50, depth information may be generated using the estimated depth.

Referring to FIG. 14B, after operation S30, a depth may be estimated based on the partial stereo image data in operation S41, and depth information may be generated using the estimated depth in operation S51.

Moreover, after operation S30, an RGB conversion may be performed based on the partial stereo image data in operation S43, and color information may be generated using the resulting data in operation S53.

After operation S51 or S53, in operation S60, the processing circuit 300 may generate color and depth information iRGBD.

Figure 15A:
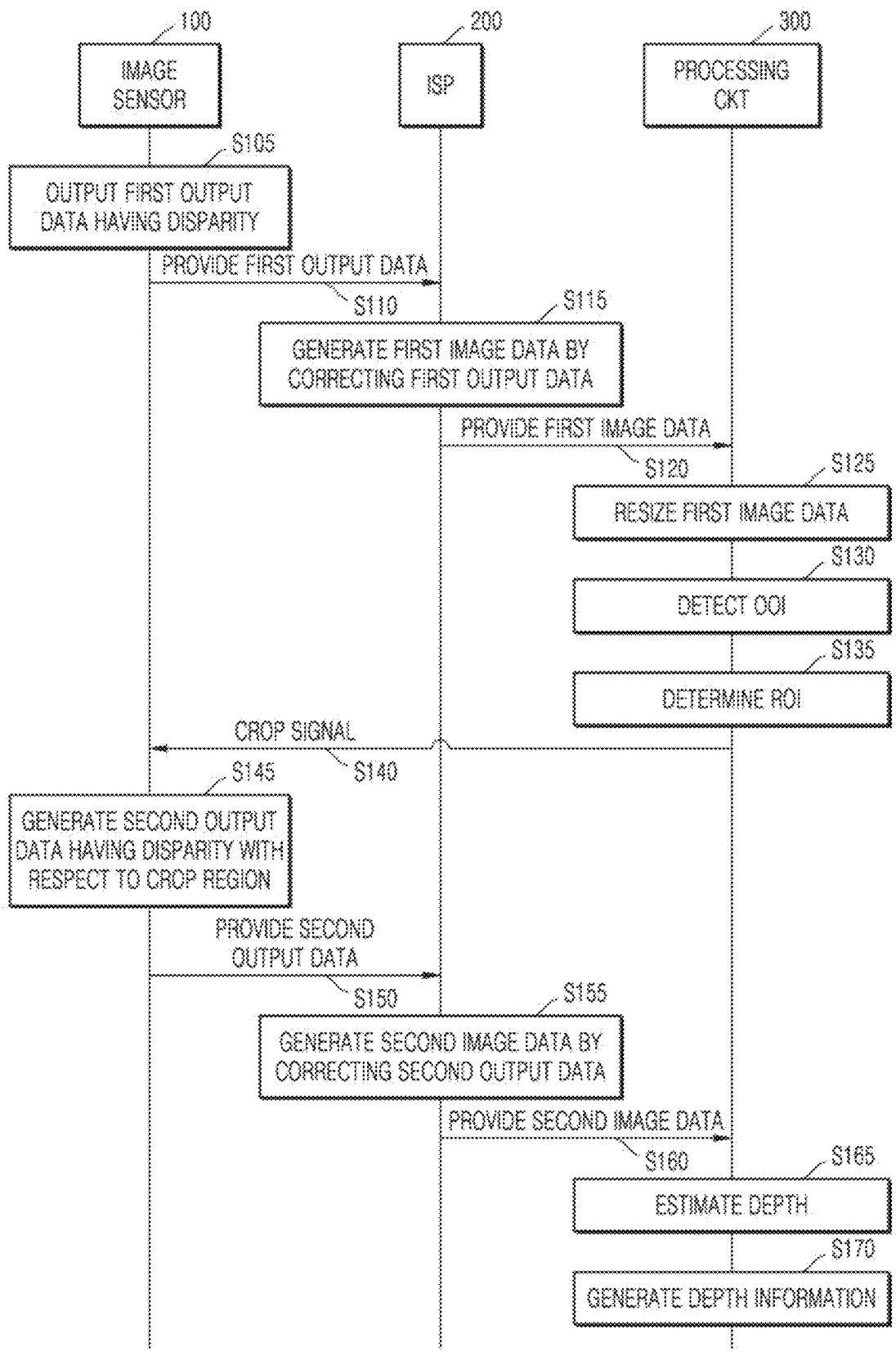

FIGS. 15A and 15B are flowcharts of operation methods of the electronic device 10, according to example embodiments.

In operation S105, first output data having a disparity may be generated. In an example embodiment, the first output data may be output from the image sensor 100, and may be a data pair generated because the image sensor 100 includes the dual pixel (101 of FIG. 1). In operation S110, the first output data may be provided to the ISP 200.

In operation S115, first image data may be generated by correcting the first output data. In an example embodiment, the ISP 200 may generate a pair of first image data by correcting the pair of output data. In operation S120, first image data may be provided.

In operation S125, the first image data may be resized. In an example embodiment, the resizer (310 of FIG. 7) may adjust a size or resolution of the image data IDAT, for example, by reducing the size or resolution of the image data IDAT. As a result of the resizer 310 adjusting the size or resolution of the image data IDAT, the amount of data processing required for object detection may be reduced.

In operation S130, an OOI may be detected. The OOI may refer to a target object desired to be detected by the user among a plurality of objects constituting a scene.

In operation S135, an ROI may be determined. In an example embodiment, the ROI may include the OOI and have a size equal to or larger than a bounding box surrounding the OOI. In operation S140, the processing circuit 300 may transmit a crop signal CROP to the image sensor 100.

In operation S145, second output data having a disparity with respect to a crop region may be generated. In an example embodiment, the second output data may be output from the image sensor 100 and may be a partial data pair for the scene, which is generated by the image sensor 100 based on the crop signal CROP. In operation S150, the second output data may be provided to the ISP 200.

In operation S155, the ISP 200 may generate second image data by correcting the second output data. In operation S165, a depth for the second image data may be estimated, and in operation S170, depth information may be generated based on the depth estimated for the second image data.

An operation method of the electronic device 10 according to an example embodiment is now described with reference to FIG. 15B in conjunction with FIG. 15A. Generation of depth information by the processing circuit 300 in operation S205 may correspond to the generation of the depth information based on the depth estimated for the second image data as described above with reference to FIG. 15A.

In operation S210, a mode change signal may be transmitted to the image sensor 100. For example, the image sensor 100 may support, as an operating mode, a first mode in which the image sensor 100 stereo image data (SIDAT of FIG. 1) is generated using the dual pixel (101 of FIG. 1), a second mode in which single image data is generated based on an image signal from one photoelectric conversion element provided in a single pixel or in which image data is generated using the dual pixel 101, i.e., by summing image signals respectively from a plurality of photoelectric conversion elements included in the dual pixel 101, and/or a third mode in which stereo luminance data sensed by the dual pixel 101 is generated in addition to single image data. The mode change signal may instruct a change from any one of the first through third modes to another mode. For example, an operating mode of the image sensor 100 may change to the third mode. For convenience of description, an operation method of the electronic device 10 when an operating mode of the image sensor 100 changes to the third mode is now described with reference to FIG. 15B.

In operation S215, the image sensor 100 may generate third output data having a disparity and fourth output data having a Bayer pattern. The fourth output data may be generated by summing image signals respectively from a plurality of photoelectric conversion elements included in the dual pixel 101 In operation S220, the third and fourth output data may be provided to the ISP 200.

In operation S225, third image data may be generated by correcting the third output data. For example, the ISP 200 may generate the third image data by performing AF correction, automatic white noise correction, etc. on the third output data having a disparity. The third image data may be related to depth information.

In operation S230, fourth image data may be generated by converting and correcting the fourth output data. For example, the ISP 200 may generate the fourth image data by converting the fourth output data having a Bayer pattern into data in a YUV format including luminance information and chrominance information and then performing AF correction, automatic white noise correction, etc. on the resulting data. The fourth image data may be related to color information. In operation S235, the third and fourth image data may be provided to the processing circuit 300.

In operation S240, a depth may be estimated based on the third image data. For example, the processing circuit 300 may estimate a depth based on the third image data. The processing circuit 300 may estimate, via the depth estimator 370, depth information including a relative depth and an absolute depth for the third image data.

In operation S245, RGB conversion may be performed on the fourth image data. For example, the processing circuit 300 may obtain color information based on the fourth image data.

In operation S250, RGBD information may be generated. For example, the processing circuit 300 may generate depth and color information RGBD based on the depth information and the color information.

Figure 16A:
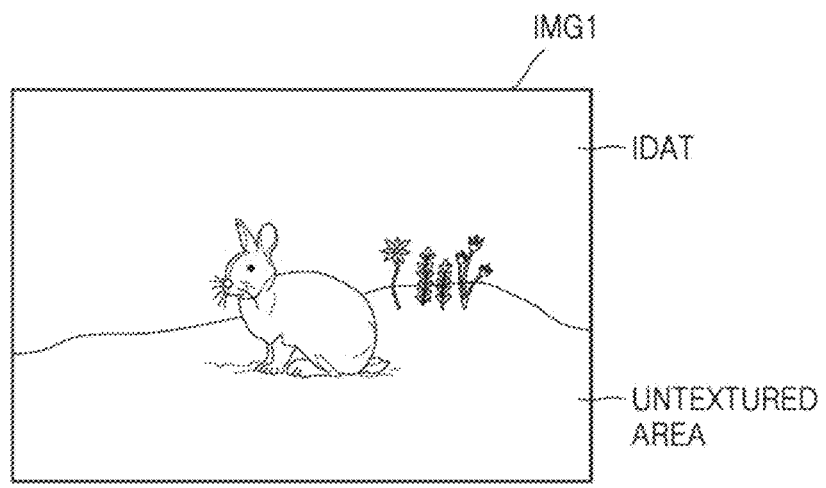
FIGS. 16A, 16B, and 16C are diagrams illustrating a result of depth estimation on image data according to an example embodiment.
Figure 16B:
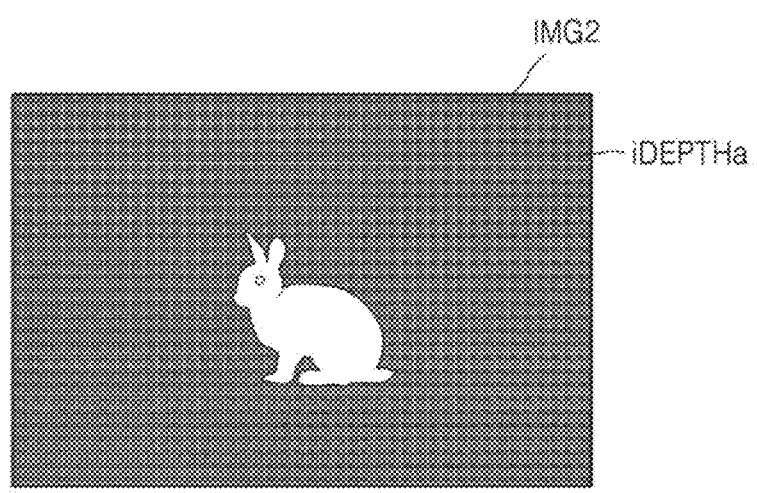
Figure 16C:
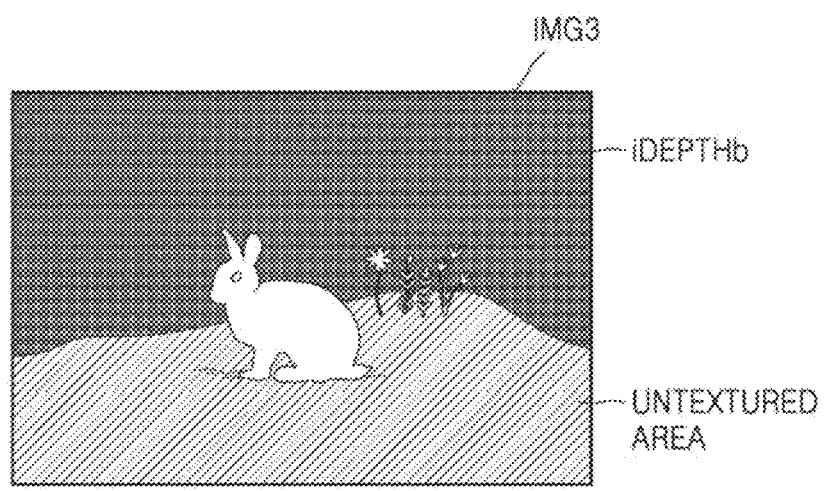

FIGS. 16A through 16C are diagrams illustrating results of depth estimation on image data according to an example embodiment.

Referring to FIG. 16A, a first image IMG1 may include an object, for example, a rabbit and a background. The first image IMG1 may correspond to image data IDAT. As a background in the first image IMG1, a hill may be understood as an untextured area in which image pixels are sparsely distributed, a boundary abruptly changes, or edges are rare Referring to FIG. 16B, a second image IMG2 includes an object, for example, a rabbit and a background and represents a depth map corresponding to depth information iDEPTHa. A depth map is an image or a channel of the image that contains a distance from an image sensor or observation point to a surface of an object and information related to the distance, and a distance from a user's viewpoint (or image sensor) to a surface of objects on a screen may be defined as depth information.

The second image IMG2 shows depth information according to contrast, and as a portion of the second image IMG2 appears bright that is close to white, the portion may be defined as a portion having a small depth value, and as a portion of the second image IMG2 appears dark or close to black, the portion may be defined as a portion having a large depth value.

The depth information iDEPTHa is generated by the DFE 371, the D.NET module 373, and the post-processing layer 377 of FIG. 9A. According to an example embodiment, the processing circuit 300 may distinguish the object (rabbit) from the background by applying only the luminance data YDAT robust to low light to an artificial neural network for estimating an absolute depth.

Referring to FIG. 16C, a third image IMG3 includes an object, for example, a rabbit and a background and represents a depth map corresponding to depth information iDEPTHb.

The depth information iDEPTHb is generated by the DFE 371, the S.NET module 375, the D.NET module 373, and the post-processing layer 377 of FIG. 9B.

According to an example embodiment, the processing circuit 300 may distinguish the object (rabbit) from the background more clearly even for data having a relatively small disparity by further combining relative depth data with absolute depth data via the S.NET module 375. For example, because an untextured area in the third image IMG3 is an area that cannot be observed in the second image IMG2, it may be seen that the depth map of FIG. 16C is improved, compared to the depth map of FIG. 16B.

Figure 17:
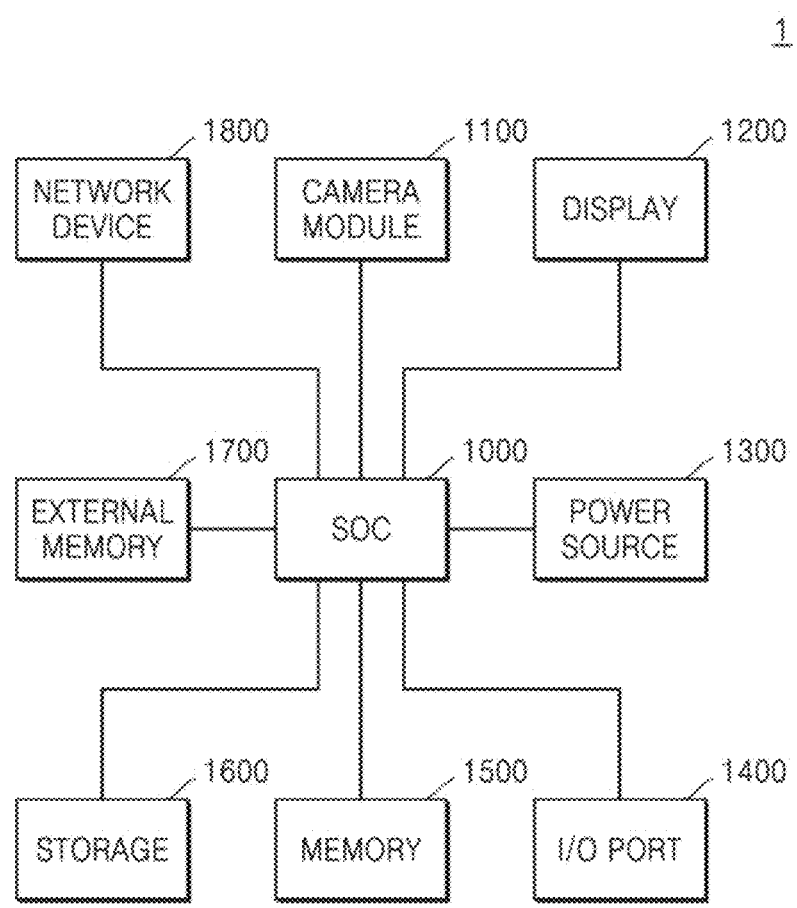
FIG. 17 is a block diagram of an electronic system according to an example embodiment.

FIG. 17 is a block diagram of an electronic system 1 according to an example embodiment.

Referring to FIG. 17, an SoC 1000 of FIG. 17 may be applied to the electronic device 10 of FIG. 1. In other words, the SoC 1000 of FIG. 17 may be designed to support the electronic device 10 of FIG. 1. The SoC 1000 shown in FIG. 17 may correspond to the electronic device 10 shown in FIG. 3. The SoC 1000 may control an operation of at least one of the components.

The electronic system 1 may be implemented as a PC, a data server, or a portable electronic device. The portable device may be a laptop computer, a mobile phone, a smartphone, a tablet PC, a PDA, an enterprise digital assistant (EDA), a digital still camera, a digital video camera, a portable multimedia player (PMP), a personal or portable navigation device (PDN), a handheld game console, or an electronic book (e-book) terminal.

The electronic system 1 may include the SoC 1000, a camera module 1100, a display 1200, a power source 1300, input/output (I/O) ports 1400, a memory 1500, a storage 1600, an external memory 1700, and a network device 1800.

The camera module 1100 may convert optical images into electrical images. Accordingly, the electrical images output from camera module 780 may be stored in the storage 1600, the memory 1500, or the external memory 1700. Furthermore, the electrical images output from the camera module 1100 may be displayed on display 1200. The camera module 1100 may include the image sensor 100 of FIG. 1, or the image sensor 100 and the ISP 200 of FIG. 1.

The display 1200 may display data output from the storage 1600, the memory 1500, the I/O ports 1400, the external memory 1700, or the network device 1800. The power source 1300 may supply an operating voltage to at least one of the components. The I/O ports 1400 are ports capable of transmitting data to the electronic system 1 or transmitting data from the electronic system 1 to an external device. For example, the I/O ports 1400 may include a port for connecting a pointing device such as a computer mouse, a port for connecting a printer, and a port for connecting a Universal Serial Bus (USB) drive.

The memory 1500 may be implemented as a volatile or non-volatile memory. According to an example embodiment, a memory controller configured to control data access operations, such as a read operation, a write operation (or a program operation), or an erase operation of the memory 1500, may be integrated embedded into the SoC 1000.

According to another example embodiment, the memory controller may be implemented between the SoC 1000 and the memory 1500.

The storage 1600 may be implemented as a hard disk drive (HDD) or solid state drive (SSD).

The external memory 1700 may be implemented as a secure digital (SD) card or multimedia card (MMC). According to an example embodiment, the external memory 1700 may be a subscriber identity module (SIM) card or universal SIM (USIM) card.

The network device 1800 may refer to a device that enables the electronic device 1 to connect to a wired or wireless network.

Figure 18:
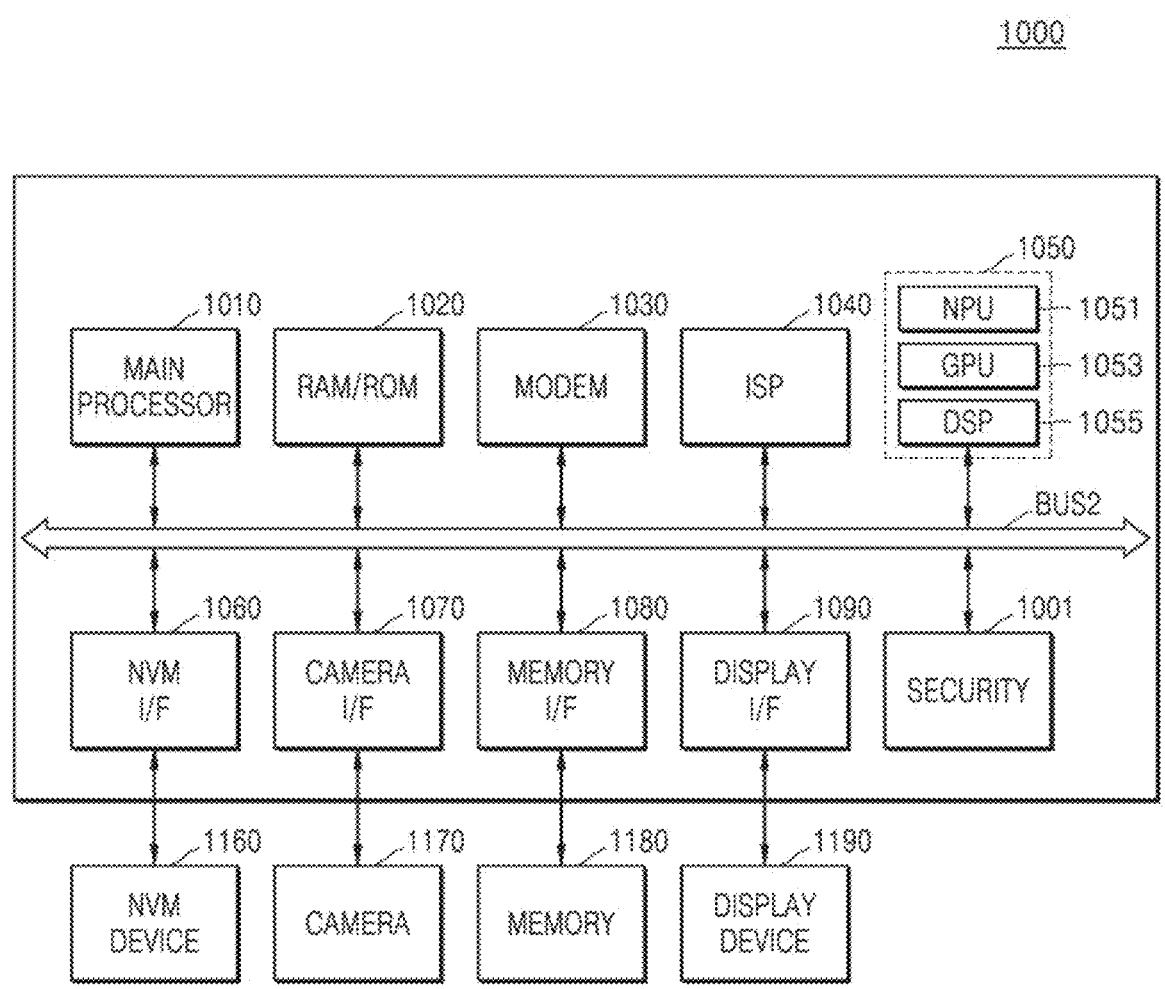
FIG. 18 is a block diagram of a system-on-chip (SOC) of FIG. 17 according to an example embodiment.

FIG. 18 is a block diagram of the SoC 1000 of FIG. 17 according to an example embodiment.

Referring to FIG. 18, the SoC 1000 may include a main processor 1010, a ROM/RAM 1020, a modem 1030, an ISP 1040, an NPU 1051, a GPU 1053, an accelerator module 1050 including a DSP 1055, a non-volatile memory I/F 1060, a camera I/F 1070, a memory I/F 1080, and a display I/F 1090. Components of the SoC 1000, i.e., the main processor 1010, the ROM/RAM 1020, the modem 1030, the ISP 1040, the non-volatile memory I/F 1060, the camera I/F 1070, the memory I/F 1080, and the display I/F 1090 may transmit/receive data via a second bus BUS2.

The main processor 1010 may control all operations of the SoC 1000. The main processor 1010 may be implemented as, for example, a CPU, a microprocessor, an advanced RISC machine (ARM) processor, an X86 processor, a microprocessor without interlocked pipelined stages (MIPS) processor, etc., and according to an example embodiment, may be implemented as one computing component having two or more independent processors (or cores), i.e., a multi-core processor. The main processor 1010 may process or execute instruction code (instructions) and/or data stored in the ROM/RAM 1020.

The RAM/ROM 1020 may temporarily store programs, data, and/or instructions. According to an example embodiment, the RAM 1020 may be implemented as DRAM or SRAM. The RAM 1020 may temporarily store data that is input/output through I/Fs, i.e., the non-volatile memory I/F 1060, the camera I/F 1070, the memory I/F 1080, and the display I/F 1090, or has undergone image processing by the ISP 200.

The non-volatile memory I/F 1060 may interface data input from or output to a non-volatile memory device 1160. The non-volatile memory device 1160 may be implemented as, for example, a memory card (MultiMediaCard (MMC), embedded MMC (eMMC), SD, micro SD, etc.)

The camera I/F 1070 may interface image data, for example, raw image data, input from the camera 1170 located outside the SoC 1000. A camera 1170 may generate data for an image captured using a plurality of photoelectric conversion elements. Image data received via the camera I/F 1070 may be provided to the ISP 200 or stored in a memory 1180 through the memory I/F 1080.

The memory I/F 1080 may interface data input from or output to the memory 1180. According to an example embodiment, the memory 1180 may be implemented as a volatile memory such as DRAM or SRAM or a non-volatile memory such as resistive RAM (ReRAM), PRAM, or NAND flash.

The display I/F 1090 may interface data, for example, image data, output to a display device 1190. The display device 1190 may output an image signal corresponding to the image data onto a display such as a liquid-crystal display (LCD) or active matrix organic light emitting diode (AMO-LED) display.

The ISP 1040 generate converted image data by performing image processing on image data provided from the camera 1170, and store the converted image data in the memory 1180, or scale the converted image data and provide a scaled image to the display device 1190. In addition, the SoC 1000 may further include a security device 1100 including a security method, a protocol, and encryption and decryption keys.

While example embodiments have been described with reference to the figures, it will be understood by those of ordinary skill in the art that various changes in form and details may be made therein without departing from the spirit and scope as defined by the following claims and their equivalents.

What is claimed is:

1. An electronic device comprising:
 a camera module configured to sense an object based on a plurality of photoelectric conversion elements and generate stereo image data having a disparity based on at least two of the plurality of photoelectric conversion elements sharing a micro lens;
 a memory configured to store at least one instruction and the stereo image data; and
 a processing circuit configured to execute the at least one instruction to:
  detect an object of interest based on the stereo image data;
  transmit a crop signal to the camera module to cause the camera module to generate partial stereo image data corresponding to a region of interest including the object of interest; and
  generate depth information based on at least the partial stereo image data.

2. The electronic device of claim 1, wherein the stereo image data includes a pair of first image data and second image data, and
 wherein the processing circuit is further configured to detect the object of interest based on the first image data.

3. The electronic device of claim 2, wherein the camera module is further configured to generate third image data by reducing a size of the first image data, and
 wherein the processing circuit is further configured to detect the object of interest in the third image data.

4. The electronic device of claim 2, wherein the processing circuit is further configured to generate the depth information by estimating a depth based on the pair of the first image data and the second image data.

5. The electronic device of claim 1, wherein the camera module is further configured to generate the partial stereo image data having a disparity with respect to the object of interest by sensing the region of interest based on the crop signal.

6. The electronic device of claim 1, wherein the processing circuit is further configured to generate the depth information by estimating an absolute depth, corresponding to an actual distance between the camera module and the object of interest, by using a first artificial neural network.

7. The electronic device of claim 6, wherein the processing circuit is further configured to generate the depth information by estimating a relative depth based on features of a scene corresponding to the stereo image data based on a second artificial neural network, and wherein the relative depth is a distance from the camera module to the object of interest and is relative to a distance from the camera module to another object.

8. The electronic device of claim 1, wherein the processing circuit is further configured to generate the depth information based on luminance data included in the stereo image data.

9. The electronic device of claim 1, wherein the camera module is further configured to operate in operating mode comprising a first mode in which the stereo image data is generated, a second mode in which general image data having no disparity is generated, and a third mode in which the stereo image data and the general image data are both generated.

10. The electronic device of claim 9, wherein the processing circuit is further configured to output, after generating the depth information, a mode signal configured to change the operating mode of the camera module to the third mode.

11. The electronic device of claim 10, wherein the processing circuit is further configured to generate color information by converting the general image data to a red-green-blue (RGB) format, and output the color information and the depth information.

12. An electronic device comprising:
a camera module configured to generate stereo image data including first image data and second image data having a disparity with respect to an object;
a memory configured to store at least one instruction and the stereo image data; and
a processing circuit configured to execute the at least one instruction to detect an object of interest in the first image data, and transmit a crop signal to the camera module to cause the camera module to generate partial stereo image data including a region of interest including the object of interest,
wherein the camera module is further configured to generate, based on the crop signal, the partial stereo image data including first partial image data and second partial image data having a disparity with respect to the object of interest, and
wherein the processing circuit is further configured to generate depth information based on the partial stereo image data.

13. The electronic device of claim 12, wherein the camera module is further configured to generate third image data by reducing a size of the first image data, and
wherein the processing circuit is further configured to detect the object of interest in the third image data.

14. The electronic device of claim 12, wherein the processing circuit is further configured to generate the depth information by estimating a depth for the stereo image data via at least one artificial neural network.

15. The electronic device of claim 13, wherein the processing circuit is further configured to generate the depth information based on luminance data contained in the stereo image data.

16. An operation method of an electronic device comprising a camera module and a processing circuit, the operation method comprising:
generating, by the camera module, stereo image data having a disparity based on two photoelectric conversion elements sharing a micro lens;
detecting, by the processing circuit, an object of interest in the stereo image data;
generating, by the camera module, partial stereo image data by sensing a region of interest including the object of interest; and
generating, by the processing circuit, depth information by estimating a depth based on the partial stereo image data.

17. The operation method of claim 16, wherein the detecting of the object of interest in the stereo image data comprises detecting the object of interest based on first image data among a pair of the first image data and second image data included in the stereo image data.

18. The operation method of claim 17, wherein the detecting of the object of interest based on the first image data comprises detecting the object of interest in third image data obtained by reducing a size of the first image data.

19. The operation method of claim 16, wherein the generating of the depth information comprises generating the depth information based on luminance data included in the stereo image data.

* * * * *